United States Patent
Mohanty et al.

(10) Patent No.: US 12,441,871 B2
(45) Date of Patent: Oct. 14, 2025

(54) COMPOSITION COMPRISING FUNCTIONALIZED RUBBER AND GRAPHENE, PROCESSES AND APPLICATIONS THEREOF

(71) Applicant: Reliance Industries Limited, Mumbai (IN)

(72) Inventors: Subhra Mohanty, Navi Mumbai (IN); Ritesh Dhanorkar, Gadchiroli (IN); Sibanarayan Tripathy, Puri (IN); Mrinmoy Debnath, Cooch Behar (IN); Abhijit Adhikary, Kolkata (IN); Virendrakumar Gupta, Navi Mumbai (IN)

(73) Assignee: Reliance Industries Limited, Mumbai (IN)

( * ) Notice: Subject to any disclaimer, the term of this patent is extended or adjusted under 35 U.S.C. 154(b) by 609 days.

(21) Appl. No.: 17/642,571

(22) PCT Filed: Feb. 3, 2021

(86) PCT No.: PCT/IB2021/050866
§ 371 (c)(1),
(2) Date: Mar. 11, 2022

(87) PCT Pub. No.: WO2021/156760
PCT Pub. Date: Aug. 12, 2021

(65) Prior Publication Data
US 2022/0298335 A1    Sep. 22, 2022

(30) Foreign Application Priority Data

Feb. 3, 2020 (IN) .............................. 202021004702

(51) Int. Cl.
*C08L 9/08* (2006.01)
*B60C 1/00* (2006.01)
*C08K 3/04* (2006.01)

(52) U.S. Cl.
CPC .............. *C08L 9/08* (2013.01); *B60C 1/0016* (2013.01); *C08K 3/042* (2017.05)

(58) Field of Classification Search
CPC .............. B60C 1/0016; C08F 212/08; C08F 220/1804; C08F 236/06; C08K 3/042; C08L 13/00; C08L 9/06; C08L 9/08; C08L 25/10
See application file for complete search history.

(56) References Cited

U.S. PATENT DOCUMENTS

| | | | |
|---|---|---|---|
| 9,757,983 B1 * | 9/2017 | Du ............................ | C08L 9/00 |
| 9,902,837 B2 | 2/2018 | Moutinho et al. | |
| 2002/0061955 A1 * | 5/2002 | Colvin ...................... | C08C 1/14 |
| | | | 524/502 |
| 2002/0173560 A1 * | 11/2002 | Thielen .................... | C08K 3/36 |
| | | | 524/495 |
| 2015/0299437 A1 | 10/2015 | Mruk et al. | |

FOREIGN PATENT DOCUMENTS

| KR | 101571666 | 11/2015 | |
|---|---|---|---|
| WO | WO-2017190859 A1 * | 11/2017 | |

OTHER PUBLICATIONS

KR-101571666-B1 (Nov. 25, 2015) machine translation.*
WO-2017190859-A1 (Nov. 9, 2017) machine translaiton.*
International Search Report and Written Opinion for International Application No. PCT/IB2021/050866 dated Mar. 25, 2021. 11 pages.
Mun et al., Glycidyl Methacrylate-Emulsion Styrene Butadiene Rubber (GMA-ESBR)/Silica Wet Masterbatch Compound. Polymers 2019, 11, 1000. 12 pages.

* cited by examiner

*Primary Examiner* — Ana L. Woodward
(74) *Attorney, Agent, or Firm* — Sheppard Mullin Richter & Hampton LLP

(57) ABSTRACT

The present disclosure generally relates to the field of tyre technology and pertains to compositions employed for manufacturing tyre treads. More particularly, the present disclosure provides a composition comprising functionalized styrene butadiene polymer (SBR) and graphene as a reinforcing filler, and processes for preparation and applications thereof. The reinforcement of functionalized SBR with graphene filler shows homogeneous dispersion of graphene via chemical bonding with functionalized SBR, reduces particle-particle interactions of graphene filler, reduces filler-filler interaction and hence increases in filler-graphene interaction which shows the improvement in properties such as wet grip, rolling resistance, modulus, hardness and tensile properties, rheological properties etc. A tyre tread made of the present composition is superior to a tyre tread manufactured using a composition comprising traditional fillers, such as carbon black.

20 Claims, 8 Drawing Sheets

COMPOSITION COMPRISING FUNCTIONALIZED RUBBER AND GRAPHENE, PROCESSES AND APPLICATIONS THEREOF

CROSS-REFERENCE TO RELATED APPLICATIONS

This application is a U.S. National Stage Application under 35 U.S.C. § 371 of International Application No. PCT/IB2021/050866, filed Feb. 3, 2021, which claims priority to and benefit of Indian Patent Application number 202021004702, filed Feb. 3, 2020, the contents of all of which are incorporated by reference in their entireties into the present disclosure.

TECHNICAL FIELD

The present disclosure generally relates to the field of tyre technology and pertains to compositions employed for manufacturing tyre treads. More particularly, the present disclosure provides a composition comprising functionalized styrene butadiene polymer and graphene, and processes for preparation and applications thereof.

BACKGROUND OF THE DISCLOSURE

With an ever-increasing number of cars worldwide, automotive and tyre industries play a vital role in reducing carbon dioxide footprint by reducing car fuel consumption and increasing tyre mileage without compromising on driving safety and ride quality. For this reason, tyre industries have been in a continuous development activity to expand the so-called magic triangle comprising of rolling resistance, abrasion resistance, and wet grip. A detailed look at the magic triangle reveals that lowering the rolling resistance of tyres reduces the fuel consumption of a car, whereas the higher abrasion resistance of tyres ensures higher mileage and higher lifetime, while high wet grip ensures safety. The reduction of rolling resistance of tires has become the preliminary objective for tire industries, as it has close relation to the fuel consumption, hysteresis loss properties of tire tread and carbon dioxide emission (greenhouse gases) of motor vehicles. Tire tread is major contributor to both the tire rolling resistance and its wet traction.

A tyre's composition affects grip, fuel economy and its lifetime. To adapt the property profiles of elastomer materials for car tyres with respect to the requirements of energy efficiency, adhesion and expanded life time, incorporation and homogeneous dispersion of filler particles in the polymer matrix is necessary. Dispensability of filler is considered to affect hysteresis loss.

In a typical tyre formulation used widely in industries, high abrasion furnace carbon black is employed as a reinforcing filler to improve mechanical properties of the elastomer. In order to reduce emission of pollutants and regulate air pollution due to vehicles, tire companies are looking for the material which would replace the carbon black filler with an alternate filler for low rolling resistance and better wet grip.

Graphene is a two-dimensional wonder material that holds great potential to enter new markets and replace existing materials. Graphene is a pure carbon compound that is virtually transparent and completely flexible. At only one-atom thick, it is also the thinnest material ever created. Graphene is considered as the fundamental building block for graphitic materials of all other dimensions. Long-range π-conjugation in graphene yields extraordinary thermal, mechanical, and electrical properties. Graphene can be prepared with unique purity and exhibits some remarkable properties: in particular a highly efficient electrical conductivity combined with an extremely fast charge transport and an extraordinary strength. These properties make graphene-based products potentially useful in a wide range of applications like in electronics (high speed transistors, one electron transistors) and in materials science (composite materials).

With the advent of new graphene-based products every day, it is certain that graphene is a disruptive technology waiting to be commercialized. One such application is in car tyres. Graphene with its high surface area, nano size effects and unique physical properties has emerged as anew potential material for replacing carbon black for reinforcement of polymer matrix. Pristine graphene as well as graphene derivatives have been explored, all aiming at enhancing the final properties of the composite material in terms of conductivity, mechanical properties and other functional properties such as gas barrier properties. Replacement of traditional carbon black with graphene filler can achieve the desired dynamic properties, increasing its demand in the automobile industry for energy efficient tire treads. Thus, while graphene can be employed for weight reduction of the tyre thereby allowing for better fuel efficiency and tensile modulus, keeping in mind the properties of graphene, it also impacts rolling resistance, abrasion loss, fatigue failures, and heat build-up of tyres.

Early studies on graphene-based composite materials mainly focused on the preparation of intercalated or exfoliated nano-composites. The properties of graphene-based nano-composites have often been reported to be superior to those of clay or carbon nanotubes (CNTs) polymer composites. Indeed, although CNTs show comparable mechanical properties to graphene, the later exhibits superior thermal and electrical conductivity properties. Such outstanding properties are most often ascribed to a strong graphene platelets/matrix interface and the establishment of a 3D graphene network.

Various processing routes such as melt intercalation, solution blending or in situ intercalative polymerization have been explored to get optimized dispersion of graphitic fillers into polymer matrices and improve filler/matrix interactions. Among them, the use of polymer latex particles has received increasing attention. Polymer latexes are produced by polymerization in dispersed media (e.g., emulsion, miniemulsion, suspension and dispersion polymerizations) where the most important technique is emulsion polymerization. Emulsion polymerization offers significant advantages as compared to bulk or solution polymerization owing to the better control of heat and viscosity of the medium along with the possibility of increasing the molecular weight of the polymer chains without affecting the rate of polymerization.

In the last twenty years, polymerization in dispersed media have proven highly suitable for production of polymer/inorganic particles to generate a variety of composite colloids. These can be further processed into films with improved mechanical, thermal or barrier properties compared with their pure-polymer counterparts. Although graphene is technically not an inorganic compound, their incorporation into latex suspensions involves similar concepts.

Prior art discloses graphene-based colloidal materials covering the functionalization of graphene oxide (GO) by controlled radical polymerization and its subsequent incorporation into polymeric materials.

However, graphene incorporation as filler into elastomer tyre formulations increases the curing time significantly and is observed to have non-uniform dispersion. Thus, there is a need to find alternatives that allow addition or incorporation of graphene in tyre compositions with better properties such as uniform dispersion, etc. and without causing increase in curing/vulcanization time of the resulting rubber.

SUMMARY OF THE DISCLOSURE

The present disclosure provides for a composition comprising styrene butadiene polymer and graphene for the improvement in tire technology, and processes for synthesis of the composition and applications thereof.

In particular, the present disclosure provides for a composition comprising a functionalized styrene butadiene polymer and graphene, wherein the composition comprises, based on parts per hundred of rubber (PHR),
  (i) about 45 PHR to 90 PHR of at least one conjugated diene monomer;
  (ii) about 10 PHR to about 40 PHR of at least one vinyl substituted aromatic monomer; and
  (iii) about 1 PHR to about 50 PHR of at least one polar co-monomer selected from a group comprising acrylate, propoxylate and sulphonate or any combination thereof, and
  (iv) about 0.5 PHR to about 5.0 PHR of graphene.

The present disclosure also relates to a process for preparing a composition comprising functionalized styrene butadiene polymer latex/rubber and graphene, comprising acts of:
  polymerizing at least one conjugated diene monomer, at least one vinyl substituted aromatic monomer, and at least one polar co-monomer to obtain the functionalized styrene butadiene polymer latex, wherein the at least one polar co-monomer is selected from a group comprising acrylate, propoxylate and sulphonate or any combination thereof, and wherein the conjugated diene monomer is employed at an amount ranging from about 45 PHR to about 90 PHR, the vinyl substituted aromatic monomer is employed at an amount ranging from about 10 PHR to about 40 PHR, the polar co-monomer is employed at an amount ranging from about 1 PHR to about 50 PHR,
  optionally coagulating the functionalized styrene butadiene polymer latex to obtain the functionalized styrene butadiene polymer rubber, and
adding about 0.5 PHR to about 5.0 PHR of graphene to obtain the said composition, wherein the graphene is added either prior to, during or post preparation of the functionalized styrene butadiene polymer latex or rubber.

The present disclosure also relates to a tyre tread comprising the composition of the present disclosure.

BRIEF DESCRIPTION OF THE ACCOMPANYING FIGURE

In order that the disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, in accordance with the present disclosure where:

DETAILED DESCRIPTION OF THE DISCLOSURE

Figure 1:
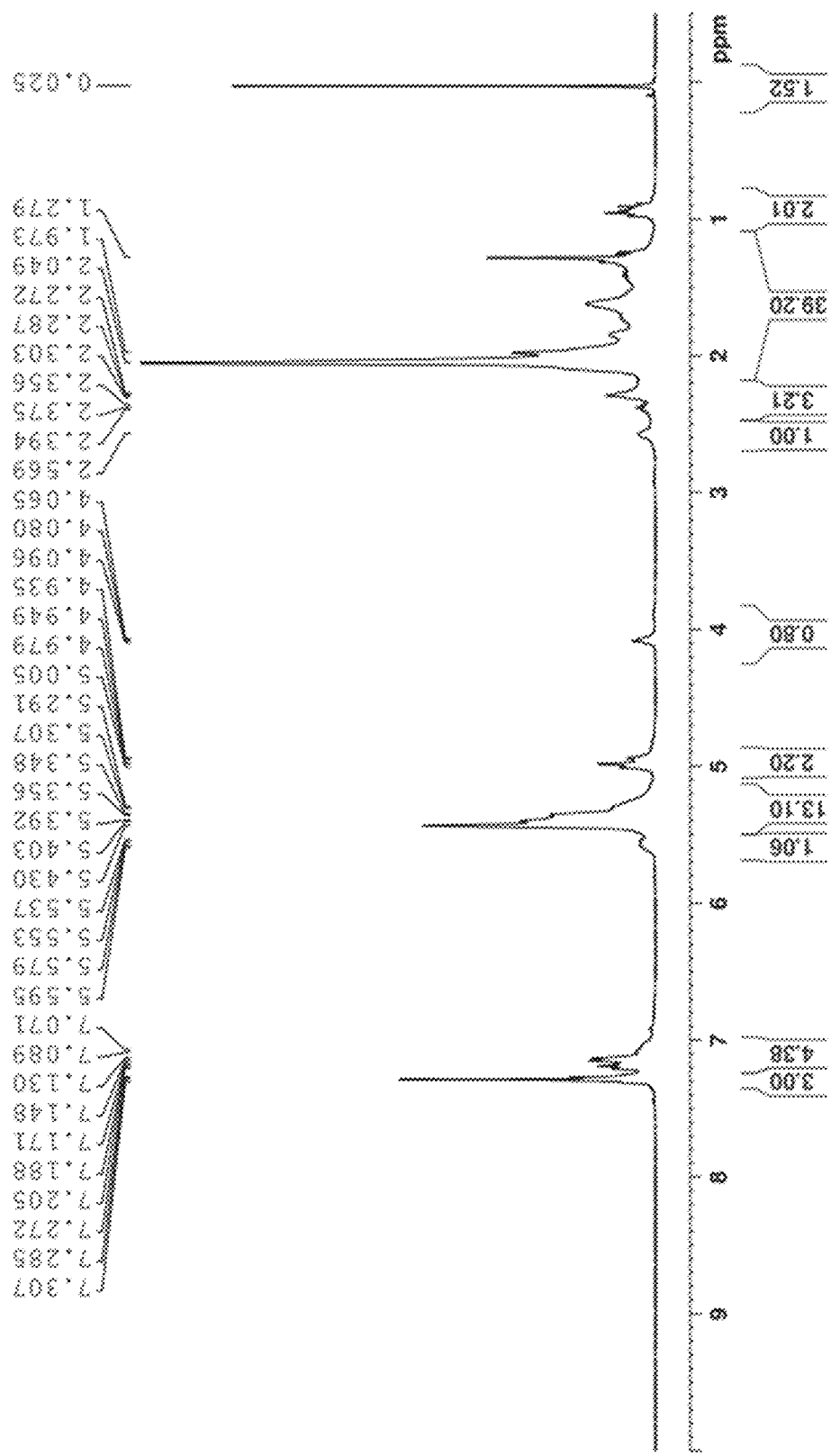
FIG. 1 depicts $^1$H NMR spectrum of Styrene-Butadiene-Butyl Acrylate Terpolymer Rubber.

In view of the drawbacks associated, and to remedy the need created by the art available in the field of tyre technology, the present disclosure aims to provide a high-performance composite/composition comprising styrene butadiene polymer latex/rubber (SBR) with graphene as a reinforcing filler. The functionalized SBR of the present disclosure is compatible with graphene as a homogeneous dispersion. The functionalized SBR-Graphene composition of the present disclosure shows improved dynamic, physical, mechanical and rheological properties. The present disclosure also provides corresponding processes for preparation of the composition and tyre comprising the functionalized rubber and graphene composition.

However, before describing the process in greater detail, it is important to take note of the common terms and phrases that are employed throughout the instant disclosure for better understanding of the technology provided herein. While the following terms are believed to be well understood by one of ordinary skill in the art, the following definitions are set forth to facilitate better understanding of the presently disclosed subject matter.

Unless otherwise defined herein, scientific and technical terms used in connection with the present disclosure shall have the meanings that are commonly understood by those of ordinary skill in the art. Further, unless otherwise required by context, singular terms shall include the plural and plural terms shall include the singular as is considered appropriate to the context and/or application. The various singular/plural permutations may be expressly set forth herein for the sake of clarity. The use of the expression "at least" or "at least one" suggests the use of one or more elements or ingredients or quantities, as the use may be in the embodiment of the disclosure to achieve one or more of the desired objects or results. Throughout this specification, the phrase "and/or" means either or both of/all of the indicated case it connects may occur.

Throughout this specification, the word "comprise" or variations such as "comprises" or "comprising" or "containing" or "has" or "having" wherever used, will be understood to imply the inclusion of a stated element, integer or step, or group of elements, integers or steps, but not the exclusion of any other element, integer or step, or group of elements, integers or steps.

Throughout this specification, the term "optional" or "optionally" means that the subsequently described event of circumstances can or cannot occur, and that the description includes instances where said event or circumstance occurs and instances in which it does not.

Throughout this specification, the term "about" means to be nearly the same as a referenced number or value. As used herein, the term "about" should be generally understood to encompass ±10% preferably ±5% of a specified amount or value.

Throughout this specification, the terms "method" and "process" are employed interchangeably.

Throughout this specification, the terms "composition" and "composite" are employed interchangeably.

Throughout the present disclosure, the term 'graphene' is intended to convey the ordinary conventional meaning of the term known to a person skilled in the art and intends to cover 'graphene' as an allotrope of carbon consisting of a single or multiple layers of carbon atoms.

Thus, the graphene employed in the present disclosure maybe a single layered or multi layered graphene. The graphene employed herein is preferably of high surface area, typically ranging between 1500 to 3000 $m^2/g$.

Throughout the present disclosure, the term 'functionalized' or 'functionalization' is used interchangeably and is intended to convey the ordinary conventional meaning of the term known to a person skilled in the art in the field of polymer or material science, and intends to cover a process of adding new functions, features, capabilities, or properties to a material by changing the microstructure/backbone of polymer of the material. In the context of rubber employed in the present disclosure, the term is used to cover functionalization of the rubber including reactions of rubber (and its derivatives) with organic and/or inorganic molecules, chemical modification of the rubber surface, and the interaction of various covalent and noncovalent components with rubber. The functionalization of rubber is microstructure modification used to reduce the cohesive force between the rubber and to manipulate the physical and chemical properties of rubber. This functionalization of rubber is also referred to as 'functionalized rubber' in the present disclosure. Throughout the present disclosure, the terms 'functionalized rubber' and 'functionalized SBR', are used interchangeably to refer to modified styrene butadiene rubber with polar functionality via emulsion polymerization and functionality developed at polymer backbone.

As used herein, the abbreviation 'SBR' refers to the styrene butadiene polymer in latex or rubber form.

As used herein, the abbreviation 'FSBR' refers to the functionalized styrene butadiene polymer in latex or rubber form.

Throughout this specification, the phrases 'functionalized styrene butadiene polymer latex', 'polymer latex', 'latex', and 'SBR polymer latex' are used interchangeably and refers to a suspension of the functionalized styrene butadiene polymer of the present invention held in a liquid medium.

Throughout this specification, the phrases 'functionalized styrene butadiene polymer rubber, 'polymer rubber', 'rubber', and 'SBR polymer rubber' are used interchangeably and refer to the solid functionalized styrene butadiene polymer of the present invention post coagulation of the functionalized SBR latex. As used herein, the abbreviations "PHR" and "phr" are used interchangeably and refer to the amount of the indicated component present in the composition of the present invention based on parts per hundred of rubber.

As used herein, the expression 'total solid content' refers to the amount of base polymer and other non-volatile ingredients left after the volatile solvent/ingredients are evaporated at high temperature.

Throughout the present disclosure, the term 'tyre' and 'tire' are used interchangeably and are intended to convey the ordinary conventional meaning of the term known to a person skilled in the art and intends to cover tyre of any composition, comprising at least one rubber/elastomer. Accordingly, in the present disclosure, any reference to a 'composition' is intended to refer to any composition known to a person skilled in the art which is used in manufacturing of a tyre and/or tyre tread.

Throughout the present disclosure, the term 'tyre tread' and 'tire tread' are used interchangeably and are intended to convey the ordinary conventional meaning of the term known to a person skilled in the art and refers to the portion of a tire that makes contact with the road or ground that extends circumferentially about the tire.

Throughout the present disclosure, the term 'tyre composition' and 'tyre tread composition' are used interchangeably.

Throughout the present disclosure, technical terms such as 'fuel efficiency', 'tensile modulus', 'rolling resistance', 'abrasion resistance', 'abrasion loss', 'fatigue failure', and 'heat build-up' are used to describe the properties of a tyre/tyre tread or characteristics of a composition that makes up the tyre/tyre tread, and are intended to convey the ordinary conventional meaning of the terms known to a person skilled in the art.

The present disclosure provides for composites/compositions comprising functionalized styrene butadiene polymer and graphene, methods of preparation and applications thereof.

In some embodiments, the present disclosure provides for reinforcing polar functionalized styrene butadiene polymer (in latex or rubber form) with graphene filler for obtaining the composition/composite of the present disclosure. The said composition is typically used for manufacturing a tyre tread and improves its properties such as rolling resistance, abrasion resistance and wet grip, etc The present disclosure relates to a composition comprising a functionalized styrene butadiene polymer and graphene, wherein the composition comprises, based on parts per hundred of rubber (PHR),
  (i) about 45 PHR to 90 PHR of at least one conjugated diene monomer;
  (ii) about 10 PHR to about 40 PHR of at least one vinyl substituted aromatic monomer; and
  (iii) about 1 PHR to about 50 PHR of at least one polar co-monomer selected from a group comprising acrylate, propoxylate and sulphonate or any combination thereof, and
  (iv) about 0.5 to about 5.0 PHR of graphene.

The polymer in the composition of the present disclosure has a polar functionality, and is in the form of either latex (liquid) or rubber (solid).

In some embodiments, the at least one conjugated diene monomer in the composition is selected from a group comprising 1,3-Butadiene, isoprene, 1,3-ethylbutadiene, 1,3-pentadiene, 1,3-hexadiene, 1,3-pentadiene, 1,3-cyclooctadiene and 1,3 octadiene or any combinations thereof.

In some embodiments, the at least one vinyl substituted aromatic monomer in the composition is selected from a group comprising styrene, α-methyl styrene, vinyl toluene, 3-methyl styrene, 4-methyl styrene, 4-cyclohexylstyrene, 4-para tolylstyrene, para-chlorostyrene, 4-tert-butyl styrene, 1-vinylnaphthalene, 2-vinylnapthalene or any combinations thereof.

In some embodiments, the acrylate in the composition is selected from a group comprising butyl acrylate, ethyl acrylate, 2-ethylhexyl acrylate, hydroxyethylmethacrylate, butyl methacrylates and vinyl acrylate or any combination thereof. In some embodiments, the propoxylate in the composition is hydroxyl butyl vinyl ether propoxylate. In some embodiments, the sulphonate in the composition is selected from a group comprising styrene sulphonate, 2-acrylamido 2-methylpropane sulphonate, sodium allyl sulphonate and sodium methallyl sulphonate or any combination thereof.

However, the polar co-monomer employed in the composition of the present disclosure is not acrylonitrile. Acrylonitrile as a third polar monomer along with conjugated diene monomer such as 1,3-butadiene and vinyl substituted aromatic monomer such as styrene for obtaining functionalized SBR is not suitable for improving fuel efficiency of tire treads.

Without being bound to a theory, acrylonitrile increases the Tg of functionalized SBR polymer, which renders it unsuitable for applications in the tire tread of the present invention.

In some embodiments of the present disclosure, the composition comprising the functionalized styrene butadiene polymer and graphene comprises, based on parts per hundred of rubber (PHR),
  about 45 PHR to 90 PHR, preferably about 45 PHR to about 70 PHR, and more preferably about 45 PHR to about 65 PHR, and values/ranges therebetween, of at least one conjugated diene monomer;
  about 10 PHR to about 40 PHR, preferably about 10 PHR to about 30 PHR, and more preferably about 10 PHR to about 20 PHR, and values/ranges therebetween, of at least one vinyl substituted aromatic monomer; and
  about 1 PHR to about 50 PHR, preferably about 1 PHR to about 30 PHR, and more preferably about 2 PHR to about 20 PHR, and values/ranges therebetween, of at least one polar co-monomer selected from a group comprising acrylate, propoxylate and sulphonate or any combination thereof, and
  about 0.5 to about 5.0 PHR and preferably about 1 PHR to about 5 PHR, and values/ranges therebetween, of graphene.

In some embodiments of the present disclosure, the functionalized styrene butadiene polymer employed in the present disclosure may contain different monomers such as but not limiting to 3, 4, 5 or more different monomers.

In some embodiments, the functionalized styrene butadiene polymer in the composition of the present invention is in the form of a terpolymer (three different monomers) or a tetrapolymer (four different monomers).

In some embodiments of the present disclosure, the polymer combination for the terpolymer comprises i) a conjugated diene monomer selected from a group comprising 1,3-Butadiene, isoprene, 1,3-ethylbutadiene, 1,3-pentadiene, 1,3-hexadiene, 1,3-pentadiene, 1,3-cyclooctadiene and 1,3 octadiene or any combinations thereof, ii) a vinyl substituted aromatic monomer selected from a group comprising styrene, α-methyl styrene, vinyl toluene, 3-methyl styrene, 4-methyl styrene, 4-cyclohexylstyrene, 4-para tolylstyrene, para-chlorostyrene, 4-tert-butyl styrene, 1-vinylnaphthalene, 2-vinylnapthalene or any combinations thereof, and iii) a polar co-monomer selected from a group comprising acrylate, propoxylate and sulphonate or any combination thereof, as defined above.

In an exemplary and non-limiting embodiment of the present disclosure, the polymer combination for the preparation of the functionalized SBR terpolymer employs 1,3-Butadiene, styrene and a polar co-monomer selected from a group comprising acrylate (such as butyl acrylate, ethyl acrylate, 2-ethylhexyl acrylate, hydroxyethylmethacrylate, butyl methacrylates or vinyl acrylate), propoxylate (such as vinyl propoxylate), and sulphonate (such as styrene sulphonate, 2-acrylamido 2-methylpropane sulphonate, sodium allyl sulphonate and sodium methallyl sulphonate).

In some embodiments of the present disclosure, the high-performance functionalized styrene butadiene polymer is synthesized using different polar co-monomers (preferably acrylates) along with styrene and 1,3-butadiene.

In some embodiments, a tetrapolymer is prepared similar to a terpolymer, wherein it comprises two polar co-monomers. In some embodiments, the high-performance functionalized styrene butadiene polymer of the present disclosure is synthesized using 2 or more different polar co-monomers (preferably acrylates) along with styrene and 1,3-butadiene.

In an exemplary and non-limiting embodiment of the present disclosure, the polymer combination for the preparation of the functionalized SBR tetrapolymer employs 1,3-butadiene, styrene, butyl acrylate, and one more polar co-monomer selected from a group comprising acrylate (such as ethyl acrylate, 2-ethylhexyl acrylate, hydroxyethylmethacrylate, butyl methacrylates or vinyl acrylate), propoxylate (such as vinyl propoxylate), and sulphonate (such as styrene sulphonate, 2-acrylamido 2-methylpropane sulphonate, sodium allyl sulphonate and sodium methallyl sulphonate). In some embodiments, the second polar monomer in the tetrapolymer is present in small amounts such as ranging from about 1 PHR to about 3 PHR.

In a preferred embodiment, the at least one conjugated diene monomer in the composition is 1,3-Butadiene.

In a preferred embodiment, the at least one vinyl substituted aromatic monomer in the composition is styrene.

In a preferred embodiment, the at least one polar co-monomer in the composition is butyl acrylate.

In an exemplary and non-limiting embodiment of the present disclosure, the composition comprising the functionalized styrene butadiene polymer and graphene comprises, based on parts per hundred of rubber (PHR), about 45 PHR to 90 PHR of 1,3-Butadiene, about 10 PHR to about 40 PHR of styrene; about 1 PHR to about 50 PHR of at least one polar co-monomer selected from a group comprising butyl acrylate, propoxylate and/or sulphonate; and about 0.5 to about 5.0 PHR of graphene.

In some embodiments, the composition of the present disclosure may further comprise all or some of the customary additive(s)/conventional ingredient(s) used in rubber compositions for tyres, especially for tyre treads, such as for example plasticizer, accelerator, activator, antioxidant, antiozonant, tire reinforcement, textile reinforcement, metal reinforcement, aromatic oil and curing agent or any combination thereof.

In an exemplary and non-limiting embodiment of the present disclosure, the conventional ingredient/additive is at an amount ranging from about 0.1 PHR to about 50 PHR based on parts per hundred of rubber.

In an embodiment of the present disclosure, the acrylate, propoxylate or sulphonate introduces hydroxyl, ether or ester and sulphanate functional groups into the styrene butadiene molecular backbone which introduces strong chemical bond and/or hydrogen bonding to facilitate homogenous dispersion and reduce particle-particle interactions of graphene filler. The functionality present in the rubber composition reacts with silica filler through hydrogen bonding and gives homogeneous dispersion of silica filler in the polymer matrix which would reduce the rolling resistance and carbon footprints of tire tread.

In an embodiment of the present disclosure, the composition of the present disclosure is a functionalized terpolymer comprising graphene, functionalized by acrylate, propoxylate or sulphonate, preferably acrylate.

The present disclosure also pertains to a process of obtaining the composition of the present disclosure.

In some embodiments of the present disclosure, the composition is synthesized by modified emulsion polymerization process compatible with graphene filler.

In some embodiments of the present disclosure, the composition comprising the functionalized styrene butadiene polymer, such as but not limiting to functionalized styrene butadiene terpolymer, is synthesized by emulsion polymerization technique.

In some embodiment of the present disclosure, synthesis of the composition comprising the FSBR-Graphene filler is carried out via post reactor mixing process optionally along with process aid/softeners, curing agent, coupling agents etc.

In some embodiments, the process for preparing the composition comprising functionalized styrene butadiene polymer (in latex or rubber form) and graphene, comprises acts of:
polymerizing at least one conjugated diene monomer, at least one vinyl substituted aromatic monomer, and at least one polar co-monomer to obtain the functionalized styrene butadiene polymer latex, wherein the at least one polar co-monomer is selected from a group comprising acrylate, propoxylate and sulphonate or any combination thereof,
optionally coagulating the functionalized styrene butadiene polymer latex to obtain the functionalized styrene butadiene polymer rubber, and adding graphene to obtain the said composition, wherein the graphene is added either prior to, during or post preparation of the functionalized styrene butadiene polymer latex or rubber.

In some embodiments, the graphene filler is added in the afore-said process either prior to or during the polymerization step. Alternately, it may be added post the polymerization step, i.e., to the functionalised styrene butadiene polymer when in latex form. Alternately, it may be added post the coagulation step, i.e., to the functionalized styrene butadiene polymer rubber (solid form).

In some embodiments, the optional step of coagulating is carried out if it is desired to obtain the FSBR-graphene filler in solid composite form. Thus, if the graphene filler is added to the functionalized SBR latex (liquid form) then coagulation is mandatory to get SBR-Graphene in solid composite form. Alternately, the graphene filler can also be added post coagulation in solid functionalized SBR rubber.

In some embodiments, the process for preparing the composition of the present disclosure comprising functionalized styrene butadiene polymer latex or rubber and graphene comprises acts of:
i) polymerizing at least one conjugated diene monomer, at least one vinyl substituted aromatic monomer, and at least one polar co-monomer in presence of graphene to obtain the composition comprising the functionalized styrene butadiene polymer latex and graphene, and
ii) optionally coagulating the composition comprising the functionalized styrene butadiene polymer latex and graphene to obtain the composition comprising the functionalized styrene butadiene polymer rubber and graphene.

In some embodiments, the process for preparing the composition of the present disclosure comprising functionalized styrene butadiene polymer latex or rubber and graphene comprises acts of:
i) polymerizing at least one conjugated diene monomer, at least one vinyl substituted aromatic monomer, and at least one polar co-monomer to obtain the functionalized styrene butadiene polymer latex,
ii) adding graphene to the functionalized styrene butadiene polymer latex and mixing to obtain the composition comprising the functionalized styrene butadiene polymer latex and graphene; and
iii) optionally coagulating the composition comprising the functionalized styrene butadiene polymer latex and graphene to obtain the composition comprising functionalized styrene butadiene polymer rubber and graphene.

In some embodiments, the process for preparing the composition of the present disclosure comprising functionalized styrene butadiene polymer latex or rubber and graphene comprises acts of:
i) polymerizing at least one conjugated diene monomer, at least one vinyl substituted aromatic monomer, and at least one polar co-monomer to obtain the functionalized styrene butadiene polymer latex;
ii) coagulating the functionalized styrene butadiene polymer latex to obtain functionalized styrene butadiene polymer rubber, and
iii) adding graphene to the functionalized styrene butadiene polymer rubber and mixing to obtain the composition comprising the functionalized styrene butadiene polymer rubber and graphene.

In some embodiments, the at least one conjugated diene monomer employed in the process is selected from a group comprising 1,3-Butadiene, isoprene, 1,3-ethylbutadiene, 1,3-pentadiene, 1,3-hexadiene, 1,3-pentadiene, 1,3-cyclooctadiene and 1,3 octadiene or any combinations thereof.

In some embodiments, the at least one vinyl substituted aromatic monomer employed in the process is selected from a group comprising styrene, α-methyl styrene, vinyl toluene, 3-methyl styrene, 4-methyl styrene, 4-cyclohexylstyrene, 4-para tolylstyrene, para-chlorostyrene, 4-tert-butyl styrene, 1-vinylnaphthalene, 2-vinylnapthalene or any combinations thereof.

In some embodiments, the acrylate employed in the process is selected from a group comprising butyl acrylate, ethyl acrylate, 2-ethylhexyl acrylate, hydroxyethylmethacrylate, butyl methacrylates and vinyl acrylate or any combination thereof. In some embodiments, the propoxylate employed in the process is vinyl propoxylate such as hydroxyl butyl vinyl ether propoxylate. In some embodiments, the sulphonate employed in the process is selected from a group comprising styrene sulphonate, 2-acrylamido 2-methylpropane sulphonate, sodium allyl sulphonate and sodium methallyl sulphonate or any combination thereof.

In some embodiments of the present disclosure, the process for preparing the composition comprising the functionalized styrene butadiene polymer and graphene comprises, based on parts per hundred of rubber (PHR),
- about 45 PHR to 90 PHR, preferably about 45 PHR to about 70 PHR, and more preferably about 45 PHR to about 65 PHR, and values/ranges therebetween, of at least one conjugated diene monomer;
- about 10 PHR to about 40 PHR, preferably about 10 PHR to about 30 PHR, and more preferably about 10 PHR to about 20 PHR, and values/ranges therebetween, of at least one vinyl substituted aromatic monomer; and
- about 1 PHR to about 50 PHR, preferably about 1 PHR to about 30 PHR, and more preferably about 2 PHR to about 20 PHR, and values/ranges therebetween, of at least one polar co-monomer selected from a group comprising acrylate, propoxylate and sulphonate or any combination thereof, and
- about 0.5 to about 5.0 PHR and preferably about 1 PHR to about 5 PHR, and values/ranges therebetween, of graphene.

In some embodiments, the functionalized styrene butadiene polymer in the process of the present invention is in the form of a terpolymer or a tetrapolymer as described above.

In some embodiments, the afore said polymerizing step in the process of the present disclosure is carried out in presence of one or more components selected from a group comprising emulsifier, modifier, water, catalyst and activator or a combination thereof.

In some embodiments, the polymerizing step to obtain the functionalized styrene butadiene polymer latex comprises acts of:
a. contacting (i) an emulsifier optionally mixed along with modifier and/or water (ii) with the conjugated diene monomer, the vinyl substituted aromatic monomer, and the at least one polar co-monomer,
b. mixing the reaction mixture thus obtained at a temperature ranging from about 5° C. to about 13° C.;
c. and optionally contacting the reaction mixture obtained from step b) with at least one catalyst, activator or a combination thereof, and mixing at a temperature ranging from about 5° C. to about 11° C. to allow polymerization.

In some embodiments of the present disclosure, the emulsion polymerization process is a radical exothermic process. Accordingly, the temperature increases gradually during the progress of reaction. Thus, the temperature of the reaction mixture is maintained in the range of about 1° C. to about 13° C., preferably about 1° C. to about 11° C. via a cooling system.

In some embodiments, the polymerizing is carried out at temperature ranging from about 5° C. to about 13° C., at a pressure ranging from about 0.5 bar to about 2 bar for a time period ranging from about 1 to about 12 h. In some embodiments, the polymerizing is carried out under nitrogen atmosphere.

In some embodiments, the polymerization is continued till the conversion of the reaction is reached to at least about 25% total solid content. In an exemplary embodiment, the polymerization is continued till the conversion of the reaction is reached to at least about 25%, at least about 30%, at least about 35%, at least about 40%, at least about 45% or at least about 50% of the total solid content. In some embodiments, the total solid content is about 30% to about 50% in presence of graphene in the latex.

In some embodiments, the functionalized styrene butadiene polymer rubber obtained by the process of the present disclosure is washed with a solvent such as but not limiting to water and is optionally dried at a temperature ranging from about 40° C. to about 80° C. for about 12 to about 96 hours. In an exemplary and non-limiting embodiment of the present disclosure, the solvent used is hot (about 70-80° C.) demineralised (DM) water.

In some embodiments, the emulsifier employed in the process of the present disclosure comprises emulsifying agents selected from a group comprising Rosin acid, fatty acid, sodium dodecyl naphthyl methyl sulphonate (DNMS), sodium lauryl sulfate, sodium dioctyl sulfosuccinate, sodium oleate, triethanolamine stearate, ethylenediaminetetraacetic acid (EDTA), potassium chloride and benzalkonium chloride or any combination thereof.

In some embodiments, the amount of the emulsifier employed in the process of the present disclosure is ranging from about 4 to about 7 PHR, preferably about 5.2 to 5.5 PHR. In some embodiments of the present disclosure, the emulsifier employed in the process for synthesis of functionalized SBR may be cationic, anionic or non-ionic.

In some embodiments of the present disclosure, the emulsifier employed in the process for synthesis of functionalized SBR comprises vegetable-based emulsifying agent(s) and/or animal-based emulsifying agent(s).

In an exemplary and non-limiting embodiment of the present disclosure, the emulsifier comprises emulsifying agents selected from a group comprising rosin acid, plant and/or animal fatty acid, DNMS, sodium lauryl sulfate, sodium dioctyl sulfosuccinate, sodium oleate, triethanolamine stearate (anionic), Benzalkonium chloride (cationic).

In an exemplary and non-limiting embodiment of the present disclosure, the vegetable-based emulsifying agent is selected from a group comprising rosin acid, vegetable based fatty acid or any combination thereof.

In another exemplary and non-limiting embodiment, the anionic emulsifier of the present disclosure comprises rosin acid, fatty acid and DNMS, optionally along with water, EDTA and KCl.

In an exemplary and non-limiting embodiment, the anionic emulsifier of the present disclosure comprises about 1 PHR to about 10 PHR of rosin acid, about 1 PHR to about 10 PHR of fatty acid; about 0.2 PHR to about 2 PHR amount of DNMS, optionally along with about 200 PHR to about 500 PHR of water, about 0.02 PHR to about 0.1 PHR of EDTA and about 0.4 PHR to about 2 PHR of KCl.

In some embodiments, the emulsifier employed in the process of the present disclosure comprises rosin acid and fatty acid in weight ratio ranging from about 10:90 to about 90:10.

In some embodiments of the present disclosure rosin acid comprises dehydroabietic acid and/or abietic acid.

In some embodiments of the present disclosure, the modifier is added at the time of adding the emulsifier.

In some embodiments, the modifier employed in the process of the present disclosure is selected from a group comprising Tert-dodecyl mercaptan (TDM), aldehydes, acids and dibenzyltrithiocarbonate or any combination thereof. In embodiments of the present disclosure, the modifier such as TDM is a chain modifier which controls the length of polymer and molecular weight.

In some embodiments, the modifier is employed at an amount ranging from about 0.15 PHR to about 0.40 PHR.

In some embodiments, the catalyst employed in the process of the present disclosure is selected from a group comprising Sodium Formaldehyde Sulfoxylate (SFS), $FeSO_4$, EDTA, $CuSO_4$, $K_2SO_4$, $NH_4SO_3$, and $NaHSO_3$ or any combination thereof. In embodiment of the present disclosure, the catalyst is SFS and $FeSO_4$ and is also called as a redox system.

In some embodiments, the catalyst is employed at an amount ranging from about 0.01 PHR to about 1.0 PHR.

In some embodiments, the catalyst contains about 0.02 PHR to about 0.1 PHR of SFS, about 0.01 PHR to about 0.05 PHR of Ferrous sulphate and about 0.05 PHR to about 0.5 PHR of EDTA in about 10 PHR to about 80 PHR of water.

In some embodiments, the activator employed in the process of the present disclosure is a peroxide selected from a group comprising but not limiting to para menthane hydroperoxide (PMHP), hydrogen peroxide and cumene hydroperoxide or any combination thereof.

In some embodiments, the activator is employed at an amount ranging from about 0.01 PHR to about 1.0 PHR.

In some embodiments of the present disclosure, the activator is diluted for conveniently transferring in the reactor as it is a highly viscous solid. In an exemplary and non-limiting embodiment, the activator is diluted with styrene.

In some embodiments of the present disclosure, addition of the catalyst and the activator is required to carry out the emulsion polymerization process. The activator is supplemented with the catalyst system to initiate the radical process.

In some embodiments of the present disclosure, emulsifier and modifier are premixed in reactor along with water before addition of catalyst and initiator/activator.

In some embodiments, the process of the present disclosure further comprises adding antioxidant to the functionalized styrene butadiene polymer latex Adding antioxidant in the latex stage after the reaction protects the rubber from degradation which may be caused due to oxygen, ozone, UV, metal impurities etc.

In an exemplary and non-limiting embodiment of the present disclosure, the antioxidant is selected from a group comprising styrenated phenol, Tris(nonylphenyl)phosphite (TNPP), Irganox, paraphenylene diamine, quinolone based, and other amine or phosphorus based antioxidants or any combination thereof.

In an exemplary and non-limiting embodiment of the present disclosure, the antioxidant is selected from a group comprising poly(1,2-dihydro-2,2,4-trimethyl-quinoline) (TMQ), Tris(nonylphenyl)phosphite (TNPP), styrenated phenol, phenyl-ß-napthyl amine (PBN), octylated diphenyl amine (ODPA), p-oriented styrenated diphenyl amine (SDPA), butylated hydroxytoluene (BHT), 4-methyl-6 terlbutyl phenol (BPH), cyclic acetals (such as 2,2-dimethyl-4-methylol-1,3-dioxolane, 1,3-dioxacyclane etc.), N, N'-1,6-hexanediylbis[3,5-bis-4-hydroxyphenylpropanamide], paraphenylene diamine, etc.

In some embodiments of the present disclosure, the antioxidant is employed at an amount ranging from about 0.5 PHR to about 2 PHR.

The functionalized styrene butadiene polymer synthesized in the process of the present disclosure is in latex (liquid) form, and requires addition of coagulating agent/flocculent for coagulating the functionalized styrene butadiene polymer latex to get solid functionalized rubber for further compounding of tire formulation.

In some embodiments of the present disclosure, the coagulating agent/flocculant is selected from a group comprising strong acid such as $H_2SO_4$, sodium chloride, calcium chloride, copolymer of Epichlorohydrin and dimethylamine or any combination thereof.

In some embodiments of the present disclosure, the coagulating agent is about 20% $H_2SO_4$, about 250% sodium chloride solution, about 2-3 wt % of calcium chloride, about 0.2 to 1 PHR of a copolymer of Epichlorohydrin and dimethylamine or a combination thereof.

In some embodiments, the coagulating agent is employed at an amount ranging from about 0.2 PHR to about 1 PHR.

In an exemplary and non-limiting embodiment of the present disclosure, the coagulation occurs by adding a coagulating agent to the styrene butadiene polymer latex (such as copolymer of Epichlorohydrin and dimethylamine etc.) followed by addition of strong acid.

In some embodiments, the coagulation is carried out in the process of the present invention by:
  diluting the functionalized styrene butadiene polymer latex with water and mixing,
  optionally heating the latex to a temperature ranging from about 50° C. to about 80° C.,
  optionally adding the antioxidant and mixing, and
  adding coagulating agent to the functionalized styrene butadiene polymer latex and mixing (preferably at a temperature ranging from about 65° C. to 70° C.) to obtain the functionalized styrene butadiene polymer rubber.

In some embodiments, the process of the present disclosure requires mixing for dispersion of monomers and reagents to carry out the reaction in a homogeneous manner. In an exemplary embodiment, the mixing in the aforesaid process is carried out by continuous stirring at about 100 to 1000 rpm. In another exemplary and non-limiting embodiment of the present disclosure, the mixing is carried out by conventional techniques including but not limiting stirring, agitation or a combination thereof.

In some embodiments of the present disclosure, the process for synthesis of functionalized SBR is optimized to result in gel free or little gel (about 500 ppm) in the high conversion process via tuning the total solid content above 27-28% for desired Mooney viscosity, unlike conventional process.

In some embodiments, the process of the present disclosure is carried out under pressure of about 1 bar.

In some embodiments, the process of the present disclosure involves mixing by slow agitation (at about 100 to about 200 rpm, preferably about 200 rpm) for about 10-15 minutes. Once the temperature of the reaction mixture drops down preferably to about 6° C., agitation is stopped, pressure of reactor vessel is released and catalyst solution is added and the flask is rinsed with water.

In some embodiments of the present disclosure, initial temperature and pressure of the reaction for synthesis of the functionalized SBR and graphene composition are noted and monitored for every 15 minutes. In embodiments of the present disclosure, the total solid content of the reaction is checked after 2 hours and the progress is further monitored in every minute reaction time. Once the polymerization is completed, the reaction is quenched.

In some embodiments of the present disclosure, the polymerization for synthesis of functionalized SBR is continued till the conversion of the reaction is reached to at least about 50 to 85%, preferably about 70% with at least about 20-30% total solid content, preferably at least about 24-25% total solid content.

In some embodiments of the present disclosure, the polymerization for synthesis of functionalized SBR is allowed to be continued for about 1 to about 12 h, preferably about 3.5 h.

In some embodiments of the present disclosure, after the completion of reaction for synthesis of functionalized SBR, excess 1,3-Butadiene is vent through vent line and latex is removed from reactor. The reaction is quenched using short stop solution to kill the free radicals inside the reaction mixture.

In an exemplary embodiment of the present disclosure, the short stop solution is diisopropoyl hydroxyl amine (DIHA), and it is added along with DNMS (synthetic soap) and DM water.

In an exemplary embodiment, the DIHA is added in an amount ranging from about 1 to 5 PHR. However, any suitable stop solution/quenching agent such as ethyl hydroxylamine etc. can be alternately employed to quench the reaction.

In some embodiments of the present disclosure, the coagulation of functionalised styrene butadiene polymer latex to functionalized styrene butadiene polymer rubber is carried out by contacting the latex with water and optionally heating to temperature ranging from about 50 to about 80° C., preferably about 65° C. to about 70° C. with slow agitation of about 100 to about 1000 rpm, preferably about 200 rpm. Once the temperature reached to about 60 to about 70° C., preferably about 65° C., about 0.5 to about 2 PHR of antioxidant solution is added and stirred vigorously for about 5 to about 60 minutes, preferably about 10 minutes. About 0.2 to about 1 PHR of flocculant (such as copolymer of Epichlorohydrin and Dimethylamine, etc) is added and stirred for about 10 to about 60 minutes. Finally, a strong acid such as about 20% $H_2SO_4$ is added drop wise with vigorous stirring till the completion of coagulation. Functionalized styrene butadiene polymer rubber is taken out and washed one or more times with solvent such as water and optionally dried such as in vacuum oven at about 40 to about 80° C. for about 12 to about 96 hours.

In some embodiments of the present disclosure, about 0.5 PHR to about 5.0 PHR of graphene, preferably about 0.5 PHR to about 5.0 PHR of graphene is added to about 100 PHR of FSBR.

In some embodiments, the graphene added in the composition of the present disclosure is added in the form of graphene emulsion. In an exemplary and non-limiting embodiment of the present disclosure, the graphene emulsion comprises about 0.5 PHR to about 5 PHR of graphene in about 0.5 PHR to about 10 PHR of fatty soap. Further, in some embodiments, the graphene emulsion is added to the functionalized styrene butadiene polymer latex at temperature ranging from about 40° C. to about 55° C.

In some embodiments of the present disclosure, the graphene emulsion is prepared using emulsifier such as but not limiting to fatty soap and dispersing the same such as but not limiting to by sonication. In an exemplary embodiment, the graphene emulsion employed in the process of the present disclosure is prepared by adding about 0.5 PHR to about 5 PHR of powdered graphene to a solution of about 12-14% fatty soap (about 0.5 PHR to about 10 PHR) in water, preferably DM water, under sonication. The graphene-fatty soap emulsion mixture was subjected to sonication using probe sonicator for about 0.5 h to about 1 h.

In some embodiments of the present disclosure the fatty soap composition comprises:

Palmitic acid ($C_{16}$): $CH_3$—$(CH_2)_{14}$—COOH (preferably at a range of about 24-36%), Stearic acid ($C_{18}$): $CH_3$—$(CH_2)_{16}$—COOH (preferably at a range of about 21-32%), Oleic acid ($C_{18}$): $CH_3$—$(CH_2)_7$—CH=CH—$(CH_2)_7$—COOH (preferably at a range of about 38-45%), and/or Linoleic acid ($C_{18}$): $CH_3$—$(CH_2)_4$—CH=CH—$CH_2$—CH=CH—$(CH_2)_7$—COOH.

In some embodiments of the present disclosure, the process for synthesis of the composition/composite of the present disclosure comprising functionalized SBR with graphene filler comprises acts of synthesizing the functionalized SBR from styrene, 1,3-butadiene and polar co-monomer (such as Butyl acrylate); adding graphene; and optionally adding other industrially acceptable ingredients.

In some embodiments of the present disclosure, the process for synthesis of the composition/composite of the present disclosure comprising functionalized SBR with graphene filler comprises acts of contacting the functionalized SBR with graphene at latex stage and optionally mixing; and optionally adding other components suitable for tyre tread composition. In some embodiments of the present disclosure, the graphene filler can also be added post coagulation during the tire formulation in internal mixer.

In a preferred embodiment of the present disclosure, the process for synthesis of the composition/composite of the present disclosure comprising functionalized SBR with graphene filler comprises acts of contacting the functionalized SBR with graphene at latex stage before coagulation (before addition of coagulating agents such as sulphuric acid and/or flocculent, etc) and optionally mixing; and optionally adding other components suitable for tyre tread composition.

In an exemplary embodiment, the process for synthesis of functionalized SBR-graphene composite/composition comprises acts of:

a. adding emulsifier and optionally modifier in a reactor;

b. followed by adding styrene, polar co-monomer and 1,3-Butadiene optionally along with water, and optionally mixing, at temperature ranging from about 5° C. to about 13° C. preferably about 5° C., to obtain reaction mixture;

c. adding catalyst and/or activator to the reaction mixture, and optionally mixing;

d. optionally adding graphene emulsion prior to polymerization;

e. allowing polymerization to obtain functionalised styrene butadiene polymer latex;

f. optionally adding graphene emulsion to the latex, optionally along with/subsequently followed by adding other conventional ingredient(s), and mixing;

g. coagulating the functionalized latex (optionally comprising graphene) by adding one or more coagulating agent/flocculant and optionally adding antioxidant to obtain the functionalized styrene butadiene polymer rubber, optionally washing and optionally drying the functionalized styrene butadiene polymer rubber and h. optionally adding graphene/graphene emulsion to the functionalised styrene butadiene polymer rubber in a mixer wherein the graphene is added either prior to, during or post preparation of the functionalized styrene butadiene polymer latex or rubber to obtain the composition/composite of the present disclosure.

In some embodiments, the process comprises adding at least one conventional ingredient to the functionalized styrene butadiene polymer latex/rubber and mixing. In some embodiments, other conventional ingredients to be added to the composite are added in a mixer optionally followed by milling for preparation of vulcanizate and subsequently mixed with the SBR-Graphene mixture.

In some embodiments, about 0.1 PHR to about 50 PHR of conventional ingredient(s) is added to 100 PHR of functionalized styrene butadiene polymer latex or rubber.

In an exemplary and non-limiting embodiment of the present disclosure, the at least one conventional ingredient(s) is selected from a group comprising plasticizer(s), accelerator(s), activator(s), antioxidant(s), antiozonant(s), tire/textile/metal reinforcement(s), aromatic oil and curing agent(s) or any combination thereof.

In an exemplary and non-limiting embodiment of the present disclosure, the plasticizer is selected from a group comprising residual aromatic extract (RAE) oil, naphthenic oil, paraffinic oil and soluble sulphonic acid or any combination thereof; the accelerator is selected from a group comprising N-tert-butyl-2-benzothiazyl sulfenamide (TBBS), N-cyclohexyl-2-benzothiazole sulfenamide (CBS), N,N-Dicyclohexyl-2-benzothiazole sulfenamide (DCBS), 2-Mercaptobenzothiazole (MBT), Di Thiophosphates, Zinc O,O,O',O'-tetrabutyl bis(phosphorodithioate) (ZDBP), Tetraisobutylthiuram disulphide (IBT) and Tetraisobutylthiuram monosulphide (IBM) or any combination thereof, the activator is selected from a group comprising zinc oxide, lead oxide, magnesium oxide and stearic acid or any combination thereof, the antioxidant is selected from a group comprising poly(1,2-dihydro-2,2,4-trimethyl-quinoline) (TMQ), styrenated phenol, phenyl-ß-napthyl amine (PBN), octylated diphenyl amine (ODPA), p-oriented styrenated diphenyl amine (SDPA), butylated hydroxytoluene (BHT), 4-methyl-6 terlbutyl phenol (BPH) and cyclic acetals such as 2,2-dimethyl-4-methylol-1,3-dioxolane, 1,3-dioxacyclane etc. or any combination thereof, the antiozonant is selected from a group comprising N-1,3-dimethylbutyl)-N-phenyl-p-phenylenediamine (6PPD), (N-isopropyl-N'-phenyl-p-phenylenediamine) IPPD, N,N'-dixylene-p-phenylenediamine (DTPD) and N,N'-Bis(1,4-dimethylpentyl)-p-phenylenediamine (77PD) or any combination thereof, the aromatic oil is selected from a group comprising treated distilled aromatic extract (TDAE), residual aromatic extract (RAE) and distilled aromatic extract (DAE) or any combination thereof, the curing agent is sulphur; the metal reinforcement is selected from a group comprising steel and high strength high carbon steel or any combination thereof, and/or the textile reinforcements is selected from a group comprising nylon, rayon, aramid, polyamide and polyester or any combination thereof.

In an exemplary and non-limiting embodiment, the composition of the present disclosure comprises about 0.5 to about 2 PHR of graphene, about 3 PHR to about 4 PHR of zinc oxide, about 1 PHR to about 2 PHR of stearic acid, about 0.5 PHR to about 1.5 PHR of N-tert-butyl-benzothiazole sulfonamide (TBBS), and about 1 PHR to about 3 PHR of sulphur, based on parts per hundred of styrene-butadiene rubber (SBR).

In an exemplary and non-limiting embodiment, the composition of the present disclosure comprises about 2 PHR of graphene, about 3 PHR of zinc oxide, about 1 PHR of stearic acid, about 1 PHR of N-tert-butyl-benzothiazole sulfonamide (TBBS), and about 1.75 PHR of sulphur based on parts per hundred of styrene-butadiene rubber (SBR).

The present disclosure also pertains to a tyre tread comprising the composition of the present disclosure comprising the functionalized SBR and graphene as a reinforcing filler as defined above and a process of obtaining the same. The tire treads manufactures using the composition of the present disclosure have improved properties such as rolling resistance, abrasion resistance, dry grip and wet grip, etc.

As mentioned above, the composition of the present disclosure is a typical tyre tread composition that comprises all conventional ingredients known to be a part of or constitute a tyre, with an inclusion of functionalized SBR and graphene as a reinforcing filler. Accordingly, apart from the rubber and the reinforcing filler, the tyre tread composition of the present disclosure may comprise conventionally employed components. In an exemplary embodiment, the tyre tread composition of the present disclosure may further comprise other conventional ingredients/components including but not limited to processing aid/plasticizer(s), accelerator(s), activator(s), antioxidant(s), antiozonant(s), tire/textile/metal reinforcement(s), aromatic oil, curing agent(s), etc. or any combination thereof.

In exemplary and non-limiting embodiments of the present disclosure, the processing aid/plasticizer is selected from a group comprising residual aromatic extract (RAE) oil, naphthenic oil, paraffinic oil, soluble sulphonic acid etc., or any combination thereof.

In exemplary and non-limiting embodiments of the present disclosure, the accelerator is selected from a group comprising N-tert-butyl-2-benzothiazyl sulfenamide (TBBS), N-cyclohexyl-2-benzothiazole sulfenamide (CBS), N,N-Dicyclohexyl-2-benzothiazole sulfenamide (DCBS), 2-Mercaptobenzothiazole (MBT), Di Thiophosphates, Zinc O,O,O',O'-tetrabutyl bis(phosphorodithioate) (ZDBP), Tetraisobutylthiuram disulphide (IBT), Tetraisobutylthiuram monosulphide (IBM) etc., or any combination thereof.

In exemplary and non-limiting embodiments of the present disclosure, the activator is selected from a group comprising zinc oxide, lead oxide, magnesium oxide, stearic acid etc., or any combination thereof.

In exemplary and non-limiting embodiments of the present disclosure, the antioxidant is selected from a group comprising poly(1,2-dihydro-2,2,4-trimethyl-quinoline) (TMQ), styrenated phenol, phenyl-ß-napthyl amine (PBN), octylated diphenyl amine (ODPA), p-oriented styrenated diphenyl amine (SDPA), butylated hydroxytoluene (BHT), 4-methyl-6 terlbutyl phenol (BPH), cyclic acetals (such as 2,2-dimethyl-4-methylol-1,3-dioxolane, 1,3-dioxacyclane) etc., or any combination thereof.

In exemplary and non-limiting embodiments of the present disclosure, the antiozonant is selected from a group comprising N-1,3-dimethylbutyl)-N-phenyl-p-phenylenediamine (6PPD), (N-isopropyl-N'-phenyl-p-phenylenediamine) IPPD, N,N'-dixylene-p-phenylenediamine (DTPD), N,N'-Bis(1,4-dimethylpentyl)-p-phenylenediamine (77PD) etc., or any combination thereof.

In exemplary and non-limiting embodiments of the present disclosure, the curing agent is Sulphur (soluble and/or non-soluble) for SBR and diene rubber.

In exemplary and non-limiting embodiments of the present disclosure, the tire reinforcement is selected from a group comprising textile fibre (such as nylon, rayon, polyester, aramid, etc.), steel cord etc., or any combination thereof.

In embodiments of the present disclosure, the composite/composition of the present disclosure comprises about 0.5 to about 5.0 phr of graphene filler in about 100 phr of functionalized SBR.

In embodiments of the present disclosure, the composite/composition of the present disclosure comprises about 0.1 to about 50 phr of other components in about 100 phr of functionalized SBR.

In a non-limiting embodiment, table A illustrates exemplary composites/compositions of the present disclosure comprising functionalized SBR terpolymer rubber with graphene.

TABLE A

Composition of std. SBR-Graphene, Functionalized SBR-Graphene

| Ingredients | Amount (phr) |
| --- | --- |
| Functionalized SBR | 100 |
| Vor-X/SBR MB | About 0.5 to 10, preferably about 1.9 |
| ZnO | About 3-4, preferably about 3 |
| Stearic Acid | About 1-2, preferably about 1 |
| Total Master | About 104.5 to 116, preferably about 105.90 |
| Master | About 104.5 to 116, preferably about 105.90 |
| Sulphur | About 1 to 3, preferably about 1.75) |
| TBBS | About 0.5 to 1.5, preferably about 1 |
| Total | About 106 to 120.5, preferably about 108.65 |

While the conventionally known tyre tread compositions employ different compounds as reinforcing filler, with carbon black being the most common; the present disclosure provides a tyre tread composition where either the traditional reinforcing filler is completely or partially replaced by graphene. Thus, the composition provided by the present disclosure includes but is not limited to a previously known tyre tread composition or a new tyre tread composition, where the rubber component is replaced via functionalized SBR and graphene is employed as a reinforcing filler. The graphene so employed is of high surface area, typically ranging between 1500 to 3000 $m^2/g$, and preferably of about 2000 $m^2/g$. Incorporation of graphene in tyre tread compositions increase curing or vulcanization time of the rubber so produced. In the present disclosure, graphene employed as filler has been used to tune the curing time of compositions containing a combination of elastomers, used to make tyres.

In some embodiments, the functionalized SBR of the present disclosure is compared to SBR 1502. It is thus dispersed uniformly in rubber matrix via interaction with filler functionality. The functionalized SBR of the present disclosure with functionalized group is suitable for use with very low (such as about 1-2 PHR) quantity of graphene filler as an alternative replacement of traditional carbon black and also silica filler. The FSBR with polar functionality interacts in a better way with graphene filler which leads to better dispersion of graphene particles in rubber matrix. The synthesized functionalized SBR-graphene composites of the present disclosure show drastic improvement in skid resistance (wet & dry grip) and also rolling resistance. In an exemplary embodiment, the FSBR+graphene composition has an improvement of at least about 40% wet skid resistance, at least about 5% dry skid resistance. These enhancements indicate that the functionalized SBR is better for synthesizing fuel-efficient tires and also in other applications.

In embodiments of the present disclosure, the process for obtaining functionalized SBR is advantageous owing to the modifications in the emulsifier, modifier and/or polar monomers employed and/or the mode of addition process. Further, the process provides for high conversion rate and low gel content.

As used herein, 'Tg' refers to liquid-glass transition or glass transition temperature and is the reversible transition in amorphous materials from the broad and relatively frozen state into a molten or rubber-like state. In polymers, the glass transition temperature, Tg, is often expressed as the temperature at which the Gibbs free energy is such that the activation energy for the cooperative movement of 50 or so elements of the polymer is exceeded. This allows molecular chains to slide past each other when a force is applied. From this, one sees that the introduction of relatively stiff chemical groups will interfere with the flowing process and hence increase Tg.

Figure 12:
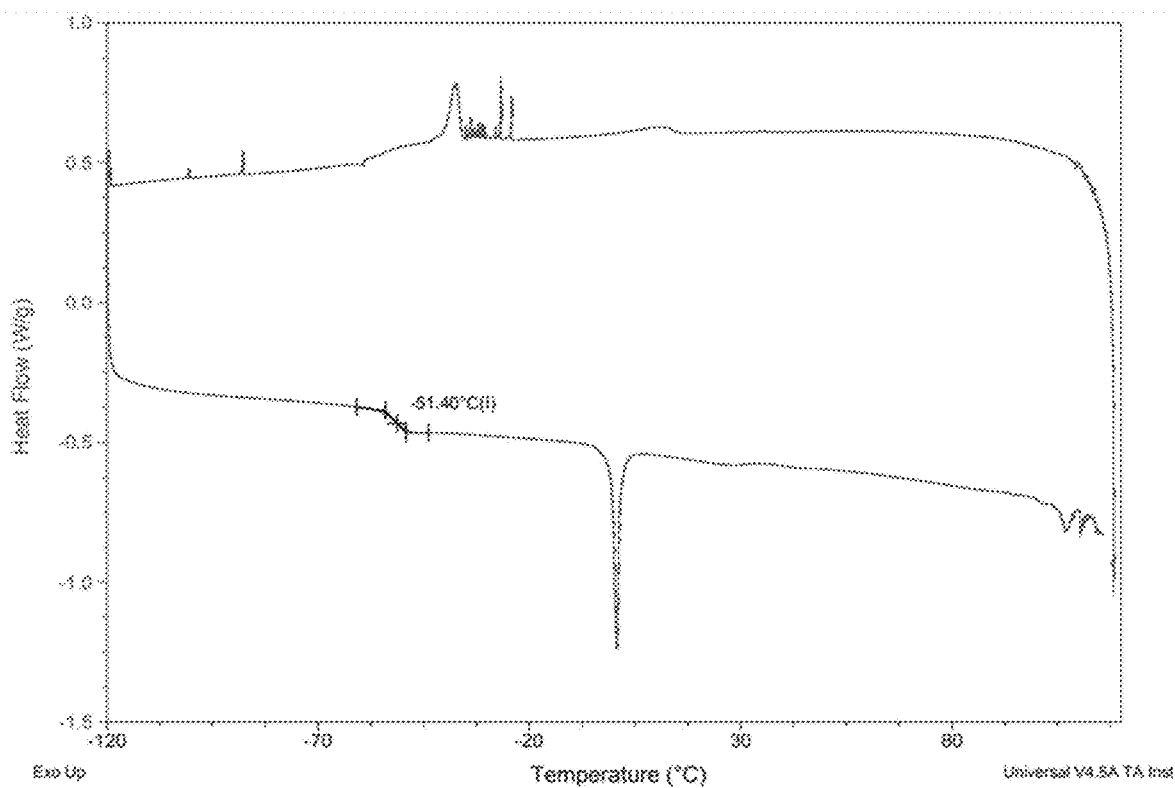
FIG. 12 depicts Glass Transition Temperature (Tg) of Styrene Butadiene Rubber (−51.4° C.).
Figure 13:
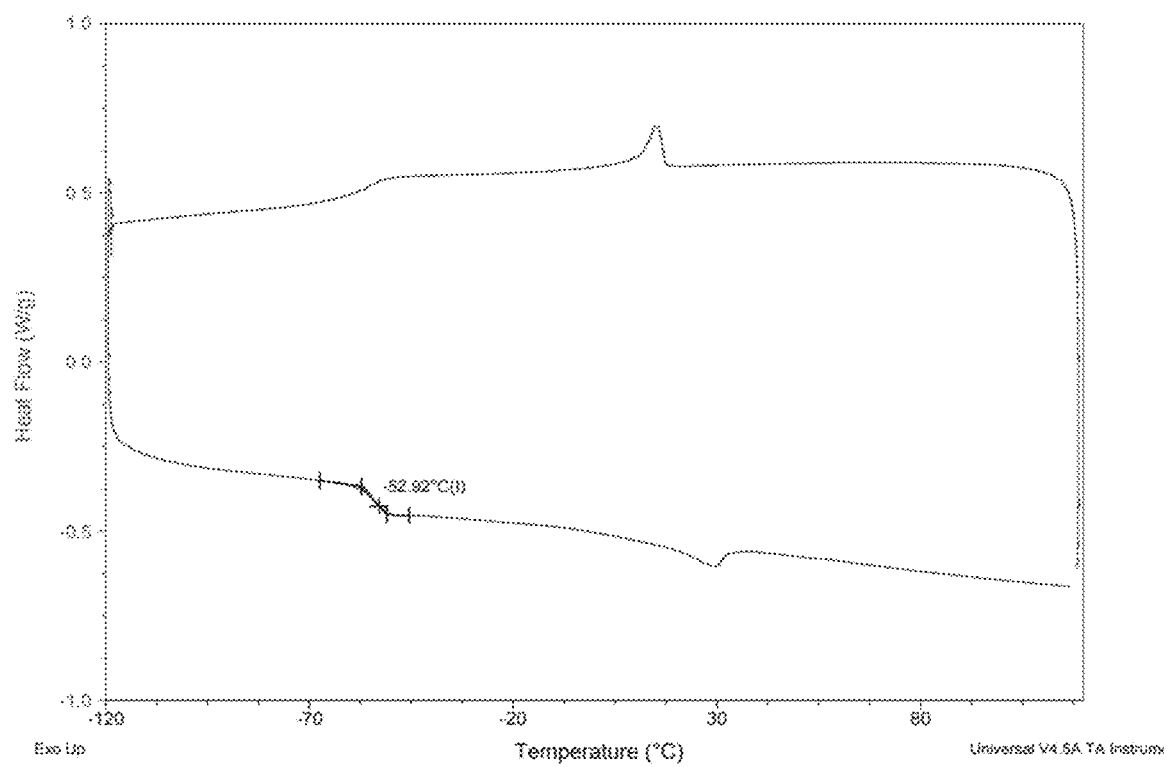
FIG. 13 depicts Glass Transition Temperature (Tg) of functionalized SBR (−52.9° C.).

In some embodiments, the composition of SBR and functionalized SBR is controlled by the amount of monomers employed therein and thereby the glass transition temperature Tg is important to balance traction and wear properties over the range that is practical for tire rubbers (SBR). Rolling resistance is highly dependent on glass transition temperature Tg, since hysteresis, the unrecoverable energy loss on deformation, increases with Tg. Thus, the rolling resistance losses (inferior fuel efficiency) also increase with Tg. SBR does have some design flexibility in the important area of T8. SBR has Tg at about −54° C. Glass transition temperature of functionalized SBR (Tg about −52.9° C., FIG. 13) shows the similar Tg of SBR (Tg −51.4° C., FIG. 12) which is important to retain the elasticity in the polymer. For polymer in tire tread, acceptable range of Tg is generally about −60° C. to about −40° C. for better fuel efficiency and low hysteresis loss. Higher Tg value such as of −30° C. or higher is undesirable for direct applications in tire tread for obtaining the desired fuel efficiency and low hysteresis loss.

In some embodiments, the amount of monomers employed in the present invention is critical to obtain the desired properties such as Tg, elasticity, rolling resistance, etc.

In some embodiments, the amount of vinyl substituted aromatic monomer such as but not limiting to styrene is critical to maintain the Tg of functionalized SBR in the desired range. Tg of styrene (polystyrene) is very high, i.e. about 100° C. With increase in the content of styrene in SBR composition, Tg of the polymer will also increase. Additionally, with increase in the amount of styrene (high Tg), the plasticity of SBR polymer will increase due to overall increment in the Tg of SBR polymer. The hysteresis loss will be more at higher Tg & thus, the energy loss will be more (high rolling resistance). High-styrene content SBR polymer thus increases plasticity and also hardness after vulcanization while processing the rubber compound. Thus, the present disclosure provides for compositions which are suitable for employing lower content of vinyl substituted aromatic monomer such as styrene. In some embodiments, the composition of the present disclosure comprises less than 40 PHR of the vinyl substituted aromatic monomer, preferably lower than 35 PHR, more preferably lower than 30 PHR, even more preferably lower than 25 PHR of the vinyl substituted aromatic monomer. In some embodiments, the amount of the vinyl substituted aromatic monomer present in the composition of the present disclosure is ranging from about 10 PHR to about 40 PHR, preferably from about 10 PHR to about 35 PHR, about 10 PHR to about 30 PHR, about 10 PHR to about 25 PHR, or about 10 PHR to about 20 PHR.

In some embodiments, the co-monomer such as butyl acrylate is a polar co-monomer employed for synthesis of SBR, which is responsible for the synthesis of the functionalized rubber. Tg of butyl acrylate is similar to that of 1,3-butadiene. Thus, addition of butyl acrylate by compensating the loading of 1,3-Butyl acrylate does not affect the overall properties (Tg) of functionalized styrene butadiene rubber.

In some embodiments, the glass transition temperature Tg of the functionalized SBR or composition comprising the functionalised SBR and graphene is lower than 40° C. In some embodiments, the Tg is ranging from about −60° C. to about −40° C., preferably about −60° C. to about −45° C.

Mooney Viscosity is defined as the shearing torque resisting rotation of a cylindrical metal disk (or rotor) embedded in rubber within a cylindrical cavity. In some embodiments, the Mooney viscosity of the composition of the present disclosure is ranging from about 25 to 80. In another embodiment of the present disclosure, the Mooney viscosity of the rubber composition is about 25, about 30, about 35, about 40, about 45, about 50, about 55, about 60, about 65, about 70, about 75 or about 80 and values therebetween.

In some embodiments, the process for preparation of the FSBR and Graphene composition is easy and provides for a homogenous dispersion of Graphene filler (in emulsion) in Functionalized SBR latex. The homogenous mixing of graphene at latex stage gives the better dispersed FSBR-Graphene composite post coagulation. This allows direct use of the composition of the present invention without requiring mixing it with additional rubber compositions to get the desired properties.

For the purposes of showcasing enhanced effect of the composition of the present disclosure, comparison is made with composition comprising conventionally employed filler, such as carbon black. Such a composition/composite is prepared by conventional methods, briefly, wherein carbon black N330 used as a filler is mixed with grade SBR 1502 employed for the preparation of the tyre tread composition. Upon mixing of the carbon black with SBR, the mixtures are combined with other conventional ingredients and mixed together. For the purposes of the experiments below, the said composition is referred to as the conventional composition comprising carbon black as the reinforcing filler.

As mentioned previously, the inclusion of functionalized SBR and graphene as a reinforcing filler enhances or improves the magic triangle of tyre technology, which includes properties such as rolling resistance, abrasion resistance and wet grip of the tyre, along with other properties including but not limited to tensile modulus, fatigue failures, heat build-up, tear strength and better dispersion. The properties are enhanced or improved in tyre tread compositions where traditional reinforcing fillers, such as carbon black in SBR, are replaced by graphene in functionalized SBR.

Conventional techniques do not allow incorporation of graphene in a composition that can be used to manufacture tyres efficiently. Graphene being fluffy and difficult to handle, a process that allows inclusion of graphene in compositions that are used for manufacturing of tyres, is important. The present disclosure accordingly provides for a functionalized SBR and a process thereof, that allows homogenously dispersion of graphene into the elastomer matrix.

In embodiments of the present disclosure, the reinforcement of modified SBR with graphene filler shows homogeneous dispersion of graphene via chemical bonding with functionalized SBR. The functionalized SBR with polar functionality interacts with graphene via van-der wall and dipole bond and facilitate homogeneous dispersion and reduces particle-particle interactions of graphene filler. The homogeneous dispersion of graphene filler in the functionalized SBR polymer matrix reduces filler-filler interaction and hence increases in filler-Graphene interaction which shows the improvement in wet Grip, rolling resistance, modulus, hardness and tensile properties and better rheological properties. The functionalized SBR-Graphene composite also shown the improvement in rheological properties (MH, ts1, ts2 T90).

In embodiments of the present disclosure, non-functionalized SBR shows poor rheological properties/abrasion/rolling resistance (tear)/skid resistance (wear)/elongation modulus at 100% and 200% which are superior for the functionalized SBR-Graphene composite of the present disclosure.

In an embodiment, preliminary dispersion study of graphene in polar SBR matrix, filler-polymer interaction studies of functionalized SBR-Graphene composites and their comparison with normal SBR-Graphene is done. The study shows the effective interaction of graphene filler functionalized SBR through chemical bonding.

The functionalized SBR-Graphene composites show improved physical, dynamic and mechanical properties.

In an embodiment, for the performance studies, dynamic properties is studied by rubber process analyzer (RPA). These studies indicates that at 0° C. and 30° C., the skid resistance (wet and dry grip) of functionalized SBR-Graphene composite shows drastic improvement of about 35-39% compared to regular SBR 1502 and graphene composites. Furthermore, at about 70° C., the tan delta (loss factor) of functionalized SBR-Graphene composite is 13% smaller than SBR 1502-Graphene composite. This indicate that rolling resistance of functionalized SBR is about 13% improved than regular SBR 1502 rubber. These studies indicate that the improved SBR synthesized from emulsion SBR is highly compatible with graphene filler and shows high performance properties in functionalized SBR-Graphene composites.

In an embodiment of the present disclosure, the synthesized functionalized SBR-Graphene composites showed drastic improvement in skid resistance (wet & dry grip) of about 36-39% compared carbon black filler. Further, result shows that, improvement in Wet Grip (at 0° C.) of about 36% compared to improvement in Dry Grip (at 30° C.) is about 39%.

In an embodiment of the present disclosure, the synthesized functionalized SBR-Graphene composites show at least about 30%, preferably at least about 35% or more improvement in skid resistance (wet & dry grip) compared to carbon black filler.

In an embodiment, the composite of the present disclosure requires much lesser amount of graphene filler compared to traditionally used fillers such as carbon black.

In an embodiment of the present disclosure, the synthesized functionalized SBR-Graphene composites show improvement in rolling resistance of about 13% compared to SBR-Carbon black filler. These enhancements indicate that the former is better to synthesize fuel efficient tires and also in other applications.

The physical properties comparison shows that tensile and hardness and modulus are comparatively superior in functionalized SBR-Graphene composite compared to SBR 1502 and carbon black composites.

The present disclosure accordingly also relates to use of the composition herein comprising the functionalized SBR and graphene as a reinforcing filler for manufacturing of tyres.

In a non-limiting embodiment, the tyres manufactured using the composition of the present disclosure having functionalized SBR graphene, display enhanced properties compared to tyres manufactured by a composition devoid of functionalized SBR and/or graphene.

Thus, in total, the present disclosure provides a tyre tread composition comprising functionalized SBR and graphene as a reinforcing filler that allows the tyre to display enhanced properties when compared to a tyre made of composition comprising conventionally used fillers, such as carbon black. In order to arrive at the said composition, the present disclosure also provides a process for functionalisation of SBR employing modified emulsion polymerisation, incorporation of graphene in the functionalized SBR, such that the curing/vulcanization time of the resulting rubber is reduced. The composition prepared in the present disclosure can accordingly be used for manufacturing of tyres, that display enhanced properties, performance and life.

In embodiments of the present disclosure, the functionalized SBR-Graphene composite decreases the overall curing time (T90) i.e., about 90% of curing unlike non-functionalized SBR.

In an exemplary embodiment, advantages of the present disclosure include but are not limited to:

Provides efficient replacement of traditional fillers such as carbon black. SBR reinforcement with traditional carbon black filler have limitations such as poor rolling resistance due to hysteresis loss. Further, carbon footprints due to carbon black filler in tire tread causes environmental pollution.

The process for preparation of the FSBR and Graphene composition is easy and provides for a homogenous dispersion of Graphene filler (in emulsion) in functionalized SBR, without increasing the curing/vulcanization time of the resulting rubber. The modified emulsion polymerization system employed herein is more efficient and economic from traditional system.

In the functionalized SBR-Graphene composite system, the chemical interaction between precipitated graphene filler and functionalized styrene-butadiene rubber causes partial restriction of polymer chain hence less hysteresis (energy) loss.

The functionalized SBR synthesized via emulsion polymerization interacts with precipitated graphene particles through strong bonding improves the dynamic properties of SBR-Graphene composites which would increase the fuel economy of tire.

The composition comprising the FSBR-graphene of the present disclosure is suitable for direct use in manufacturing tire tread, without requiring addition to raw rubber/other rubber compositions to alter its properties.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

Any possible combination of two or more of the embodiments described herein is comprised within the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While the instant disclosure is susceptible to various modifications and alternative forms, specific aspects thereof have been shown by way of examples and drawings and are described in detail below. However, it should be understood that it is not intended to limit the invention to the particular forms disclosed, but on the contrary, the intention is to cover all modifications, equivalents, and alternatives falling within the spirit and the scope of the invention as defined by the appended claims.

EXAMPLES

The present disclosure is further described with reference to the following examples, which are only illustrative in nature and should not be construed to limit the scope of the present disclosure in any manner.

Example 1

Synthesis of Functionalized SBR:

Two litre reactor was purged with nitrogen gas for 15 minutes and JULABO temperature was set at 5° C. In the reactor, about 5.2 to 5.5 PHR (about 16%) of emulsifier solution (containing about 1.56 phr of Rosin acid, about 3.64 phr of fatty acid, about 0.352 phr of DNMS, about 15 phr of DM water, about 0.05 phr of EDTA and about 0.355 phr of KCl) was added followed by addition of 0.802 gm Tert-dodecyl meraptan (TDM), and thereafter demineralised (DM) water (500 gm), styrene (121 gm), Butyl Acrylate (41 gm) and 1,3-Butadiene (220 gm) were added. The temperature of the reaction mixture was raised to 13° C. The reactor was pressurized with 1 bar pressure and slow agitation (200 RPM) for 10-15 minutes. Once the temperature of the reaction mixture dropped down to 6° C., agitation was stopped and reactor was vent to release the pressure. At 6° C., about 0.1-0.15 PHR of catalyst solution (containing about 40 phr of DM water, about 0.5 phr of SFS, about 0.42 phr of Ferrous sulphate, about 0.1 phr of 45% EDTA) was added and the flask was rinsed with additional 40 gm DM water. Additionally, 0.485 gm of activator para menthane hydroperoxide (PMHP) was charged with dilution using 20 gm of styrene. After complete addition, the reaction mixture was stirred at 1100 RPM. Initial temperature and pressure of the reaction was noted and thereafter monitored every 15 minutes. The total solid content of the reaction was checked after 2 hours and progress of the reaction is further monitored every minute of reaction time. Polymerization was continued till the conversion of the reaction reached to 70% with at least about 24-25% total solid content. After the completion of reaction (about 3.5 h), excess 1,3-Butadiene was vent through vent line and latex was removed from reactor. The reaction was quenched using short stop solution to kill the free radicals inside the reaction mixture. The total weight of the styrene-butadiene rubber (SBR) Terpolymer latex was 980 gm.

Coagulation of Synthesized SBR Latex to Functionalized SBR Rubber:

The functionalized SBR prepared in previous step was in latex (liquid) form. It was thus coagulated with flocculent and dilute sulphuric acid to get desired solid functionalized styrene butadiene terpolymer rubber. SBR Terpolymer (980 gm) latex thus obtained was transferred in a 5 little beaker equipped with mechanical stirrer. In the latex, 1000 mg of DM water was added and heated to 65-70° C. with slow agitation of 200 RPM. Once the temperature reached to 65° C., antioxidant solution (about 1 to 1.2 PHR of styrenated phenol) was added and stirred vigorously for 10 minutes. 0.5% flocculant (90 gm of copolymer of Epichlorohydrin and Dimethylamine) was subsequently added and stirred for 10 minutes. Finally, 20% $H_2SO_4$ solution was added drop wise with vigorous stirring till the completion of coagulation. Styrene butadiene terpolymer rubber was taken out and washed two times with hot DM water (2×500 gm). Dried the rubber in vacuum oven at 70° C. for 12 hours. Weight of the dried SB terpolymer rubber was 230 gm.

Figure 2:
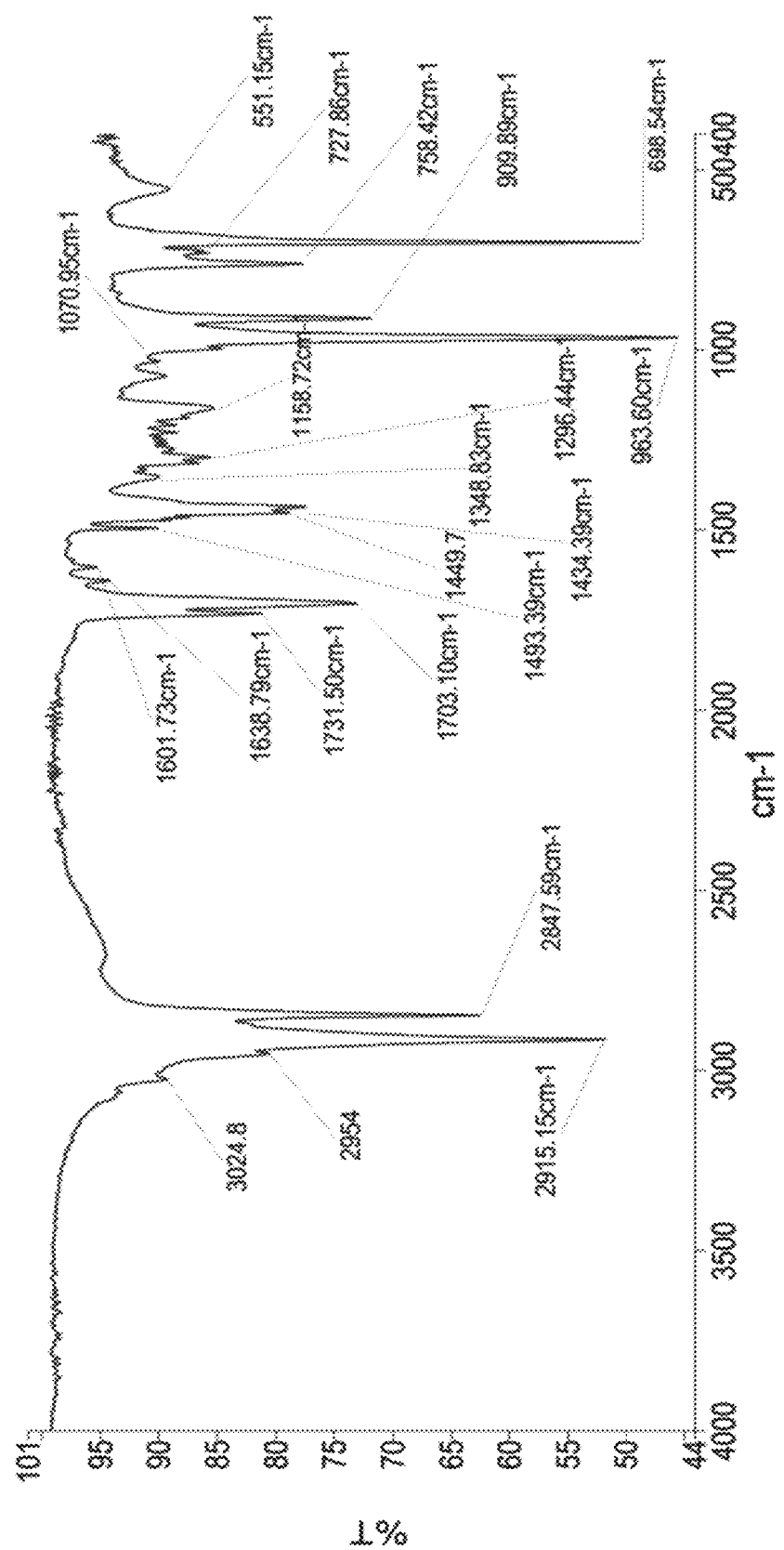
FIG. 2 depicts FT-IR spectrum of Styrene-Butadiene-Butyl Acrylate Terpolymer Rubber.

The characteristics of Styrene-Butadiene-Butyl Acrylate Terpolymer Rubber formed are provided hereunder:

Mooney Viscosity 41;

FT-IR (cm−1): 2915, 2847, 1731, 1703, 1493, 1434, 1158, 963, 909, 758, 698. FIG. 2 depicts FT-IR spectrum of the Styrene-Butadiene-Butyl Acrylate Terpolymer Rubber.

1H NMR (400 MHz, CDCl3): δ 7.23-7.11 (m, 5H, Styrene), 5.59-5.53 (m, CH=CH$_2$), 4.43-4.35 (d, —CH=CH—), 5.0-4.93 (dd, —CH=CH$_2$), 4.09-4.06 (m, 2H, —COOCH2), 2.56 (s, 1H, styrenic proton), 2.37-1.97 (m, aliphatic protons), 1.27 (m, 2H) ppm. FIG. 1 depicts $^1$H NMR spectrum of the Styrene-Butadiene-Butyl Acrylate Terpolymer Rubber.

Example 2

Synthesis of the Composite of the Present Disclosure

The Composite of the present disclosure is prepared by reinforcement of the SBR terpolymer rubber with graphene filler for the preparation of SBR (Terpolymer)-Graphene composite. Initially, the functionalized SBR is synthesized from styrene, 1,3-butadiene and polar co-monomer (Butyl acrylate) as per Example 1. Graphene was added in the functionalized styrene butadiene polymer latex in emulsion form at temperature ranging from about 40° C. to about 55° C. The graphene emulsion was prepared using fatty soap (12%) and it was dispersed using sonication method. The functionalized SBR and graphene were mixed at latex stage. The SBR-Graphene composite recipe comprises Functionalized SBR-Graphene composite 101.9 PHR. Other ingredients like zinc oxide (3 PHR), stearic acid (1 PHR), aromatic oil (5 PHR), curing agent Sulphur (1.75 PHR) and TBBS (1.0 PHR) were added in the internal mixer followed by roll mill for the preparation of vulcanizate (master batch) and were mixed with the SBR-Graphene mixture. The functionalized SBR-Graphene composite is recovered after coagulation with dilute sulphuric acid and flocculent.

For comparative study, composite of grade SBR 1502 with Carbon black N330 filler is prepared by mixing SBR and carbon black filler with the other ingredients.

Similarly, another mixture was prepared with grade SBR 1502 without any addition of carbon black/graphene.

TABLE 1

Composition of std. SBR-Graphene and Functionalized SBR-Graphene

| Ingredients | SBR Trial-1 | SBR Trial-2 | SBR Trial-10 (FSBR-GP01) |
|---|---|---|---|
| SBR 1502 | 100 | 100 | 0 |
| Vor-X/FSBR MB | 0 | 0 | 2PHR/100 FSBR |
| N330 | 0 | 12.5 PHR | 0 |
| ZnO | 3 PHR | 3 PHR | 3 PHR |
| Stearic Acid | 1 PHR | 1 PHR | 1 PHR |
| Total Master | 104.0 | 116.5 | 105.90 |
| Master | 104.0 | 116.5 | 105.90 |
| Sulphur | 1.75 PHR | 1.75 PHR | 1.75 PHR |
| TBBS | 1 PHR | 1 PHR | 1 PHR |
| Total | 106.75 | 119.25 | 108.65 |

Example 3

The performance of the FSBR-Graphene Composite of the present disclosure over conventional composite is studied for their Dynamic, Physical and Rheological properties. Compositions prepared as per Example 2 were compared with each other and with respect to compositions comprising either carbon black as filler or no filler at all. Functionalized SBR-Graphene composite was prepared by using 1.5 PHR of graphene filler and Conventional composite using 12 PHR of carbon black N330. The results of the compositions are provided in FIGS. 3-7 and tables 2-4 below, which describe the results of the following compositions: (a) a composition comprising no filler [SBR Trial-1], (b) a composition comprising carbon black as reinforcing filler [SBR Trial-2], and (d) a composition with functionalized SBR and graphene as reinforcing filler [SBR Trial-10].

Dynamic Study of SBR-Graphene Composite (Skid Resistance, Rolling Resistance)

Figure 3:
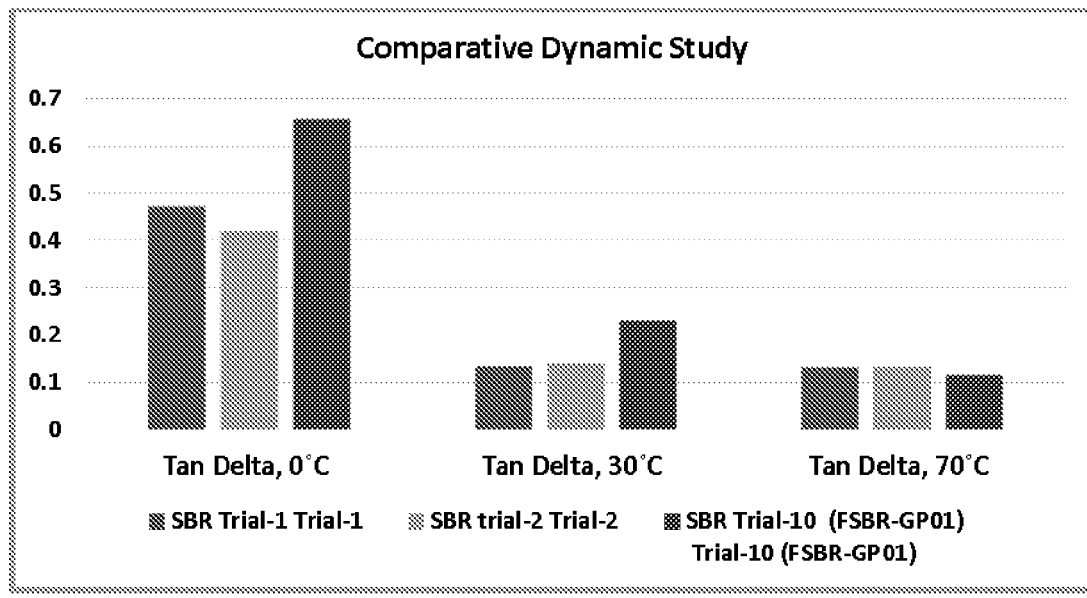
FIG. 3 depicts comparative Dynamic Properties (Skid Resistance and Rolling Resistance Data) study of SBR 1502 composition with and without carbon black as filler, and FSBR-graphene composition of the present disclosure.
Figure 4:
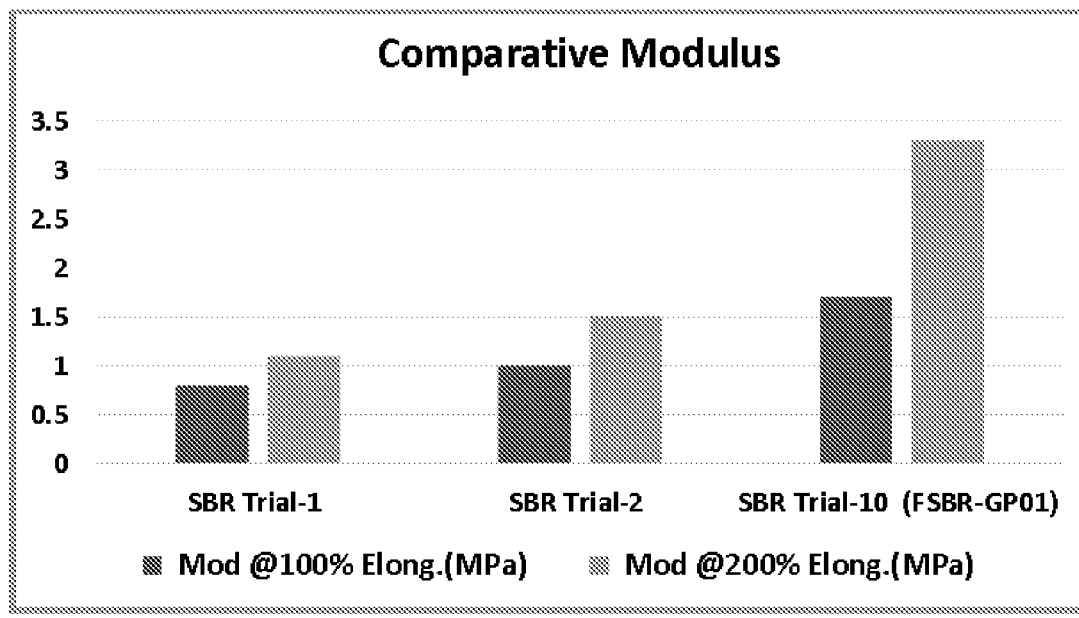
FIG. 4 depicts comparative Modulus study of SBR 1502 composition with and without carbon black as filler, and FSBR-graphene composition of the present disclosure.

Dynamic mechanical analysis (DMA) of the composites was carried out using by rubber process analyzer (RPA) in sweep shear mode at 10 Hz, 1% Dynamic Strain (−60 to 80), and the results are tabulated in Table 2 and FIG. 3. The DMA properties are carried out in RPA under the three parameters such as strain, frequency and temperature under shear mode.

TABLE 2

| DMA Temp Sweep Shear Mode @ 10 Hz, 1% Dynamic Strain (−60 to 80) | SBR Trial-1 | SBR Trial-2 | SBR Trial-10 (FSBR-GP01) |
|---|---|---|---|
| Tan Delta, 0° C. | 0.471 | 0.420 | 0.657 |
| Tan Delta, 30° C. | 0.134 | 0.140 | 0.231 |
| Tan Delta, 70° C. | 0.131 | 0.133 | 0.116 |

The synthesized functionalized SBR-Graphene composites showed drastic improvement in skid resistance (wet & dry grip) of about 36-39% compared carbon black N330 filler. Particularly, improvement in Wet Grip (at 0° C.) of 36% compared to improvement in Dry Grip (at 30° C.) is 39%. Similarly, SBR-Graphene composite shows an improvement in rolling resistance (at 70° C.) of 13% compared to SBR-Carbon black N330 filler. These enhancements indicate that the SBR-Graphene composite of the present disclosure are better for industrial application such as to synthesize fuel efficient tires, etc.

Physical Properties Study

Figure 5:
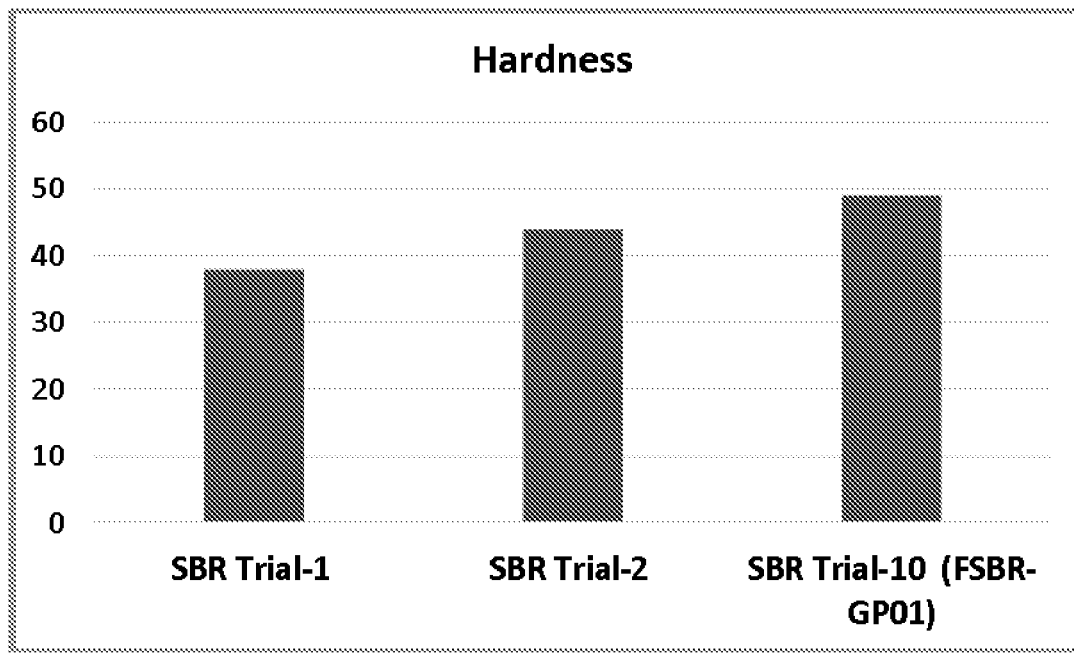
FIG. 5 depicts comparative Hardness study of SBR 1502 composition with and without carbon black as filler, and FSBR-graphene composition of the present disclosure.
Figure 6:
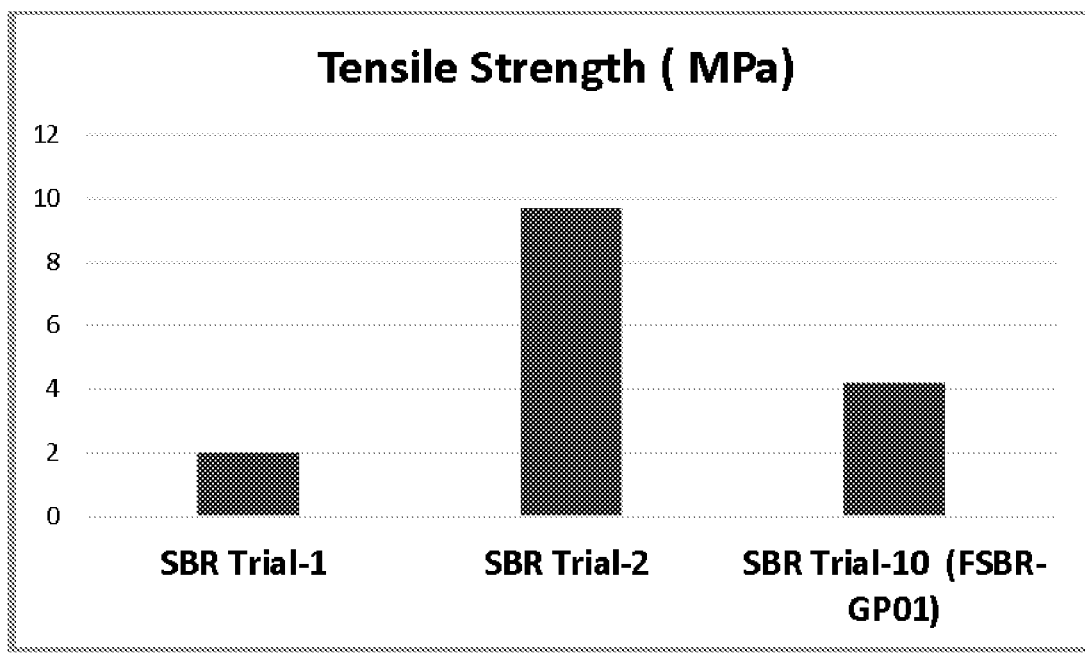
FIG. 6 depicts comparative Tensile Strength study of SBR 1502 composition with and without carbon black as filler, and FSBR-graphene composition of the present disclosure.

The FSBR-Graphene composite were tested for physical properties including modulus, tensile strength, rheological properties and dynamic properties including abrasion resistance, rolling resistance and skid resistance for radial passenger tire. These measurements were carried out at 160° C. for Tc90+5 minutes to measure the following and the results are tabulated in Table 3 and FIGS. 4-6:
- (i) Modulus at specific (X %) elongation in MPa (FIG. 4).
- (ii) Tensile strength in MPa (FIG. 6).
- (iii) Elongation at break (%).
- (iv) Hardness (FIG. 5).

TABLE 3

| Physicals-Unaged (Cured @ 160° C./ Tc90 + 5 mins) | SBR Trial-1 | SBR Trial-2 | SBR Trial-10 (FSBR-GP01) |
|---|---|---|---|
| Mod @100% Elong.(MPa) | 0.8 | 1.0 | 1.7 |
| Mod @200% Elong.(MPa) | 1.1 | 1.5 | 3.3 |
| Mod @300% Elong.(MPa) | 1.5 | 2.4 | — |
| Tensile Strength (MPa) | 2.0 | 9.7 | 4.2 |
| % Elong @ Brk. | 445 | 645 | 246 |
| Hardness (Shore A) | 38 | 44 | 49 |

The physical properties comparison shows that tensile and hardness and modulus are comparatively superior in functionalized SBR-Graphene composite compared to SBR 1502 and carbon black composites. Thus, the physical properties are significantly improved when functionalized SBR and graphene are employed in the composition.

Rheological Properties Study of SBR-Graphene Composite

The said compositions were subjected to rheological testing (physical property of FSBR-Graphene composite) under temperature of about 160° C. for about 45 minutes and using a Moving Die Rheometer. The rheological measurements (table 4) were carried out to measure the following:

i) ML (Minimum Torque): As the compound gets heated under pressure, the viscosity decreases and the torque falls. The lowest value of torque is recorded as ML. Basically, it is a measure of the stiffness and viscosity of unvulcanized compound.

ii) MH (Maximum Torque): As the curing starts, the torque increases proportionately. Depending upon the type of compound, the slope of rising torque varies. After a while the torque typically attains maximum value and it plateaus out. It is called "Plateau Curve". If test is continued for sufficient time, the reversion of cure occurs and torque tends to fall. This type of curve with reversion is called "Reverting Curve". At times the torque shows continuous rising trend during the period of record. Such type of curve is called "Rising or Marching Curve". MH (Max. torque) is the highest torque recorded in plateau curve. In reverting curve, the Max. torque recorded is abbreviated as MHR.

iii) Ts'X' (Scorch time): After attaining minimum torque, during cure phase, as the torque rises, Ts is scorch time for viscosity to rise X units above ML. Scorch is premature vulcanization in which the stock becomes partly vulcanized before the product is in its final form and ready for vulcanization. It reduces the plastic properties of the compound so that it can no longer be processed. Scorching is the result of both the temperatures reached during processing and the amount of time the compound is exposed to elevated temperatures. This period before vulcanization starts is generally referred to as "Scorch time". Since scorching ruins the stock, it is important that vulcanization does not start until processing is complete.

iii) Tc'X' (Cure time): It is the time at which X % of cure has taken place.

Figure 7:
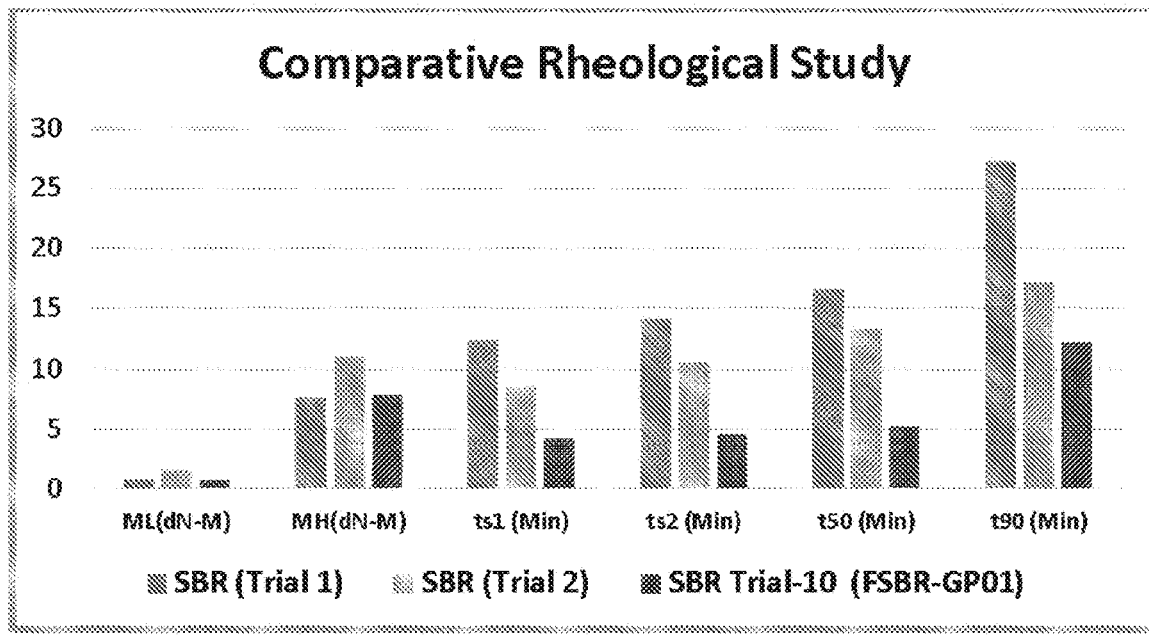
FIG. 7 depicts comparative Rheological study of SBR 1502 composition with and without carbon black as filler, and FSBR-graphene composition of the present disclosure.

The results are depicted in FIG. 7 and table 4 below.

TABLE 4

Comparative Rheological Properties of SBR-Graphene Composite and SBR-Carbon Black Composite

| Rheo Study (2000) @160° C./45 min | SBR Trial-1 | SBR Trial-2 | SBR Trial-10 (FSBR-GP01) |
|---|---|---|---|
| ML(dN-M) | 0.79 | 1.51 | 0.73 |
| MH(dN-M) | 7.63 | 10.98 | 7.80 |
| ts1 (Min) | 12.37 | 8.54 | 4.23 |
| ts2 (Min) | 14.14 | 10.55 | 4.6 |
| t10 (Min) | 11.54 | 8.53 | 4.09 |
| t25 (Min) | 13.69 | 10.95 | 4.52 |
| t40 (Min) | 15.34 | 12.35 | 4.91 |
| t50 (Min) | 16.57 | 13.33 | 5.25 |
| t90 (Min) | 27.18 | 17.12 | 12.21 |
| Final Tq.(dN-M) | 7.63 | 10.98 | 7.79 |
| Cure Rate Index (CRI) ($min^{-1}$) | 0.52 | 1.44 | 0.93 |
| Delta Tq.(dN-M) | 6.84 | 9.47 | 7.07 |

The functionalized SBR-Graphene composite also shown the improvement in rheological properties (MH, ts1, ts2 T90), modulus and hardness. The rheological properties comparison shows that the functionalized SBR-Graphene composite are comparatively superior compared to SBR 1502 and carbon black composites.

Example 4

Synthesis of the FSBR-Graphene Composite

The Composite of the present disclosure is prepared by reinforcement of the SBR terpolymer rubber with graphene filler for the preparation of SBR (Terpolymer)-Graphene composite. Initially, the functionalized SBR is synthesized from styrene, 1,3-butadiene and polar co-monomer (Butyl acrylate) as per Example 1. 1 PHR graphene was added in the functionalized SBR latex in emulsion form at temperature ranging from about 40° C. to about 55° C. The graphene emulsion was prepared using fatty soap (12%) and it was dispersed using sonication method. The functionalized SBR and graphene were mixed at latex stage.

The functionalized SBR-Graphene composite is recovered after coagulation with dilute sulphuric acid and flocculent. The SBR-Graphene composite recipe comprises functionalized SBR-Graphene composite 100 PHR. Other ingredients like HD silica (66 PHR), X50S (10.56 PHR), zinc oxide (2 PHR), stearic acid (1.5 PHR), aromatic oil (22 PHR), TMQ (0.75 PHR), 6PPD (2 PHR), curing agent Sulphur (1.8 PHR) and TBBS (1.7 PHR), DPG (2 PHR) were added in the internal mixer followed by roll mill for the preparation of vulcanizate (master batch) and were mixed with the SBR-Graphene mixture.

For comparative study, composite of grade FSBR with silica filler is prepared by mixing FSBR and silica filler without graphene, and with the other ingredients shown in the below table.

TABLE 5

| Ingredient | FSBR PHR | FSBR-Graphene PHR |
|---|---|---|
| SBT | 100 | 100 |
| Graphene | — | 1 |

TABLE 5-continued

| Ingredient | FSBR PHR | FSBR-Graphene PHR |
|---|---|---|
| HD SILICA | 66 | 66 |
| Aromatic Oil | 22 | 22 |
| X50S* | 10.56 | 10.56 |
| ZnO | 2 | 2 |
| SA | 1.5 | 1.5 |
| TMQ | 0.75 | 0.75 |
| 6PPD | 2 | 2 |
| PF RESIN | 2 | 2 |
| TBBS | 1.7 | 1.7 |
| SULPHUR | 1.8 | 1.8 |
| DPG | 2 | 2 |
| Total | 221.03 | 221.03 |

Curing study of functionalized SBR-Graphene Composite is carried out (Table 6), and it is observed that the composite of the present invention has low curing time upon addition of graphene filler. The addition of graphene in functionalised SBR shows lowering in optimum curing time of about 2 minutes (TC 90). The reduction in maximum torque by addition of graphene will make this composite easily processible compared to without graphene.

TABLE 6

| Sample code | Max. Torque (MH) (lbin) | Min. Torque (ML) (lbin) | Induc. time ($ts_1$) min. | Scorch time ($ts_2$) min. | Opt. Cure time ($Tc_{90}$) min. |
|---|---|---|---|---|---|
| FSBR | 13.03 | 1.32 | 0.99 | 1.52 | 27.09 |
| FSBR-Graphene | 11.16 | 1.90 | 0.96 | 1.50 | 25.19 |

Physical Properties Study

Figure 8:
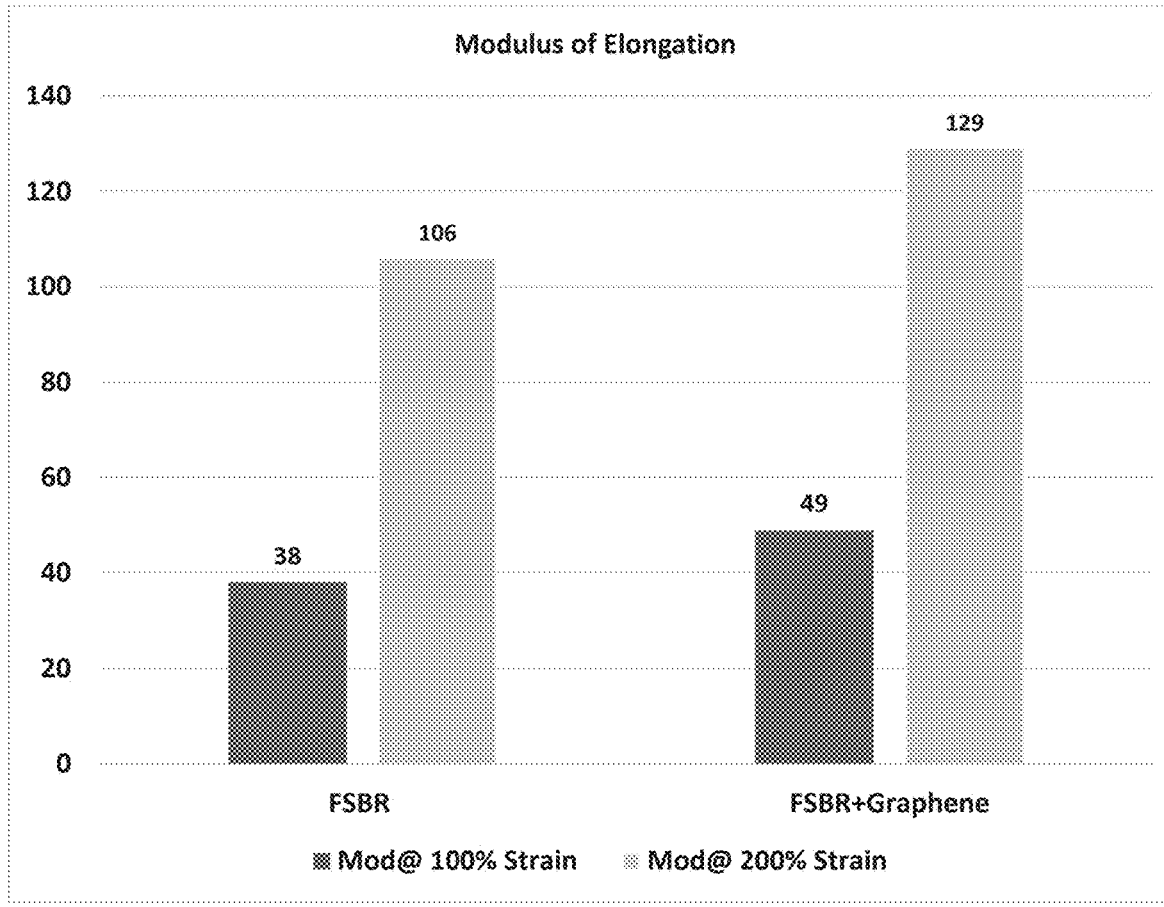
FIG. 8 depicts comparative Modulus study of FSBR and FSBR-Graphene Composites.

The FSBR-Graphene composite was tested for modulus at 100% and 200% strain. The results are tabulated in Table 7 and FIG. 8. The physical properties comparison shows that the modulus is comparatively superior in functionalized SBR-Graphene composite compared to FSBR composite in absence of graphene. Thus, the modulus is significantly improved when functionalized SBR and graphene are employed in the composition.

TABLE 7

Physical properties Study of Functionalized SBR-Graphene Composite

| No. | Properties checked | FSBR | FSBR-Graphene |
|---|---|---|---|
| i) | Modulus @ 100% strain (kg/cm$^2$) | 38 | 49 |
| ii) | Modulus @ 200% strain (kg/cm$^2$) | 106 | 129 |
| iii) | Modulus @ 300% strain (kg/cm$^2$) | — | — |

Dynamic Study of SBR-Graphene Composite (Skid Resistance, Rolling Resistance)

Figure 9:
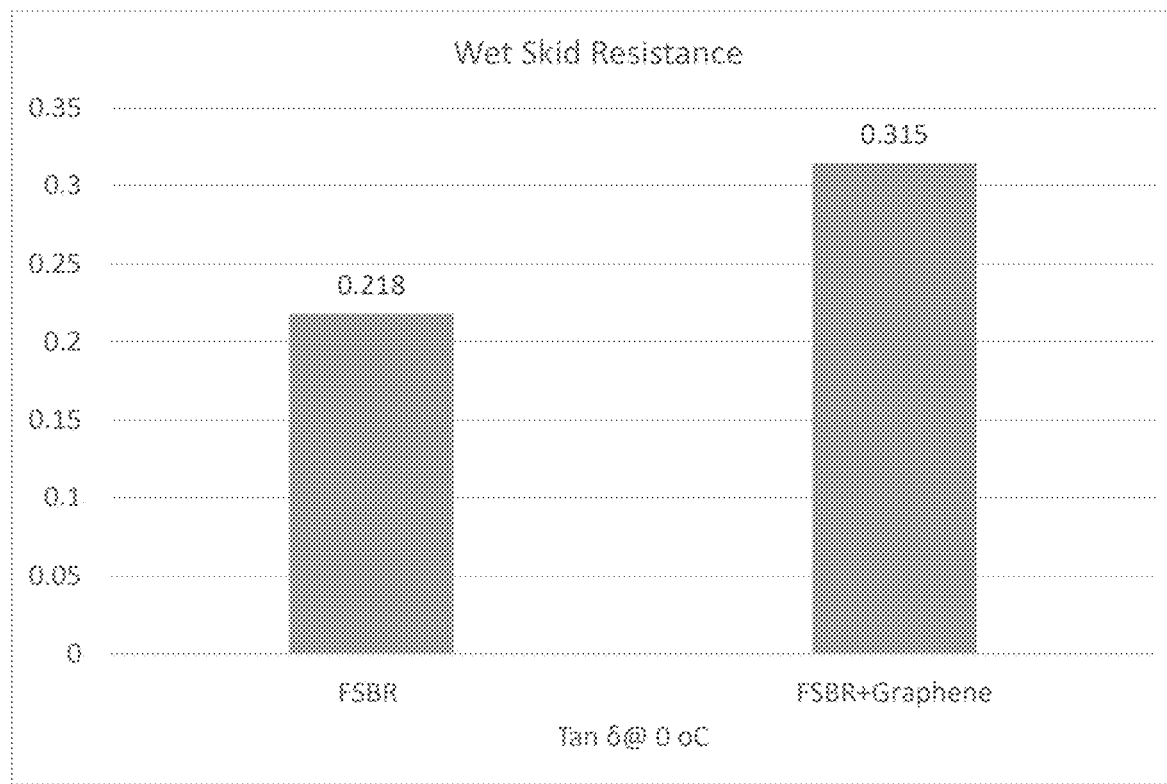
FIG. 9 depicts comparative study of wet skid resistance of FSBR and FSBR-Graphene Composites.
Figure 10:
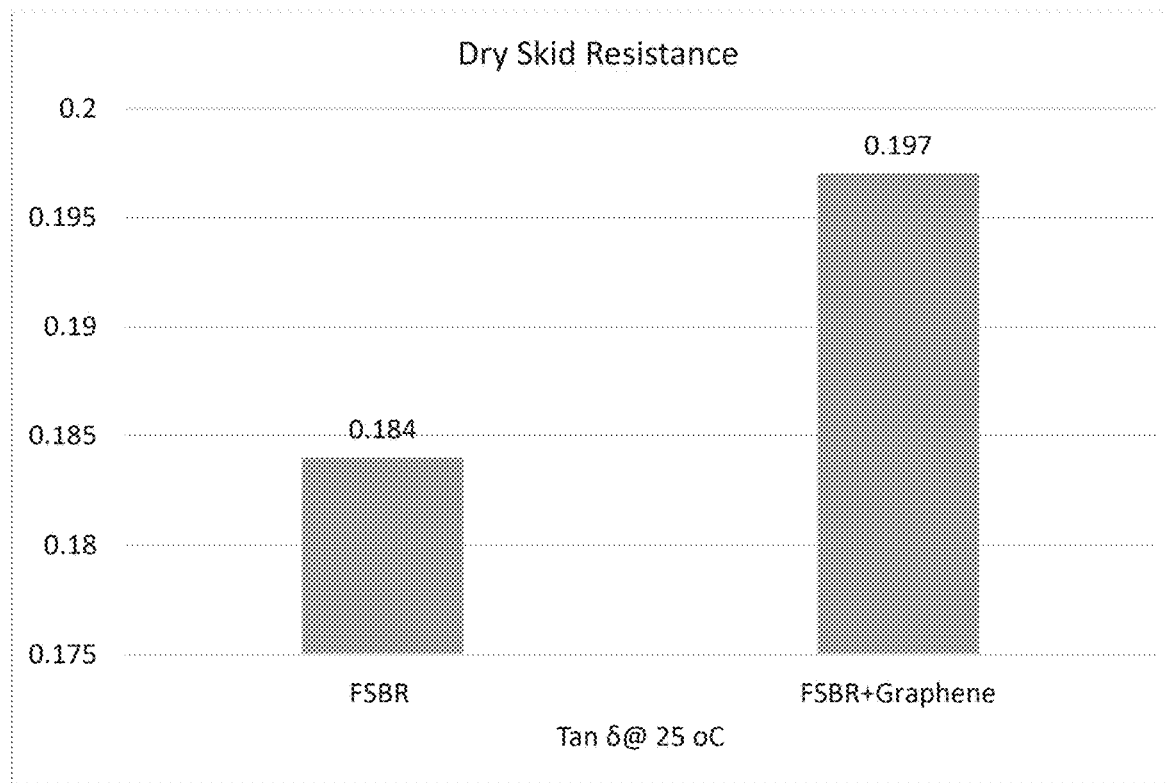
FIG. 10 depicts comparative study of dry skid resistance of FSBR and FSBR-Graphene Composites.
Figure 11:
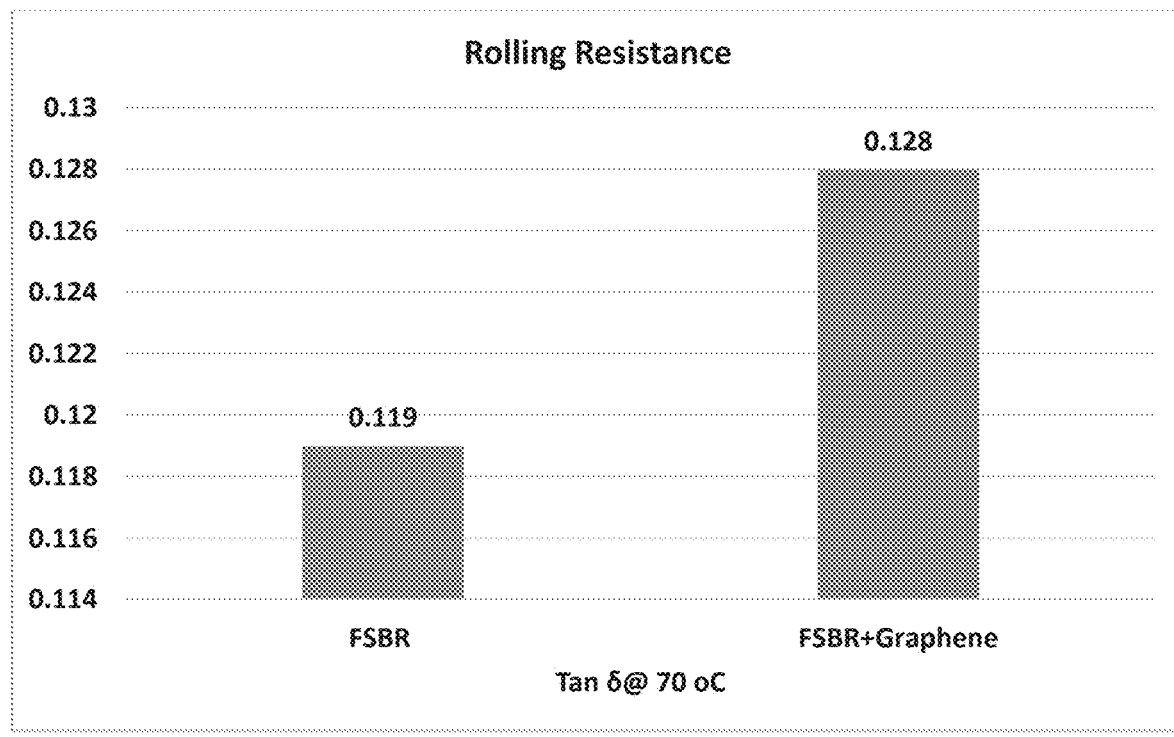
FIG. 11 depicts comparative study of rolling resistance of FSBR and FSBR-Graphene Composites.

Dynamic mechanical analysis (DMA) of the composites was carried out using by rubber process analyzer (RPA) in sweep shear mode at 10 Hz, 100 Dynamic Strain (−60 to 80), and the results are tabulated in Table 8 and FIGS. 9-11.

TABLE 8

DMA Physical Study

| Ingredients | FSBR | FSBR-Graphene |
|---|---|---|
| Tan δ@0° C. | $2.81 \times 10^{-1}$ | $3.15 \times 10^{-1}$ |
| Tan δ@25° C. | $1.84 \times 10^{-1}$ | $1.97 \times 10^{-1}$ |
| Tan δ@70° C. | $1.19 \times 10^{-1}$ | $1.28 \times 10^{-1}$ |
| E' (Pa) @0° C. | $3.3 \times 10^7$ | $3.31 \times 10^7$ |
| E' (Pa) @25° C. | $1.65 \times 10^7$ | $1.5 \times 10^7$ |
| E' (Pa) @70° C. | $9.23 \times 10^6$ | $7.21 \times 10^6$ |
| E" (Pa) @0° C. | $9.28 \times 10^6$ | $1.04 \times 10^7$ |
| E"(Pa) @25° C. | $3.03 \times 10^6$ | $2.95 \times 10^6$ |
| E"(Pa) @70° C. | $1.10 \times 10^6$ | $9.22 \times 10^5$ |

The synthesized FSBR-Graphene composites showed drastic improvement in skid resistance (for both wet & dry grip) compared to composites lacking graphene filler. Particularly, improvement in Wet Grip (at 0° C.) (FIG. 9) as well as Dry Grip (at 25° C.) (FIG. 10) was observed. The addition of 1 PHR of graphene increase the wet skid resistance by at 44% as compared to without graphene. Similarly, the dry skid resistance improved by 7% for FSBR-Graphene composite. Similarly, the SBR-Graphene composite shows an improvement in rolling resistance (at 70° C.) compared to FSBR composite lacking graphene filler (FIG. 11). These enhancements indicate that the SBR-Graphene composite of the present disclosure is better for industrial application such as to synthesize fuel efficient tire treads, etc.

We claim:

1. A composition comprising a polymer and about 0.5 parts per hundred of rubber (PHR) to about 5.0 PHR of a filler, wherein the polymer comprises:
    (i) about 45 PHR to 70 PHR of at least one conjugated diene monomer;
    (ii) about 10 PHR to about 30 PHR of at least one vinyl substituted aromatic monomer; and
    (iii) about 1 PHR to about 30 PHR of at least one polar co-monomer selected from the group consisting acrylate, methacrylate, propoxylate, and sulphonate;
    and wherein the filler consists of graphene.

2. The composition of claim 1, wherein the polymer is in the form of latex or rubber; wherein the polymer is a terpolymer or a tetrapolymer; wherein the at least one conjugated diene monomer is selected from the group consisting of 1,3-Butadiene, isoprene, 1,3-ethylbutadiene, 1,3-pentadiene, 1,3-hexadiene, 1,3-pentadiene, 1,3-cyclooctadiene, and 1,3 octadiene; wherein the at least one vinyl substituted aromatic monomer is selected from the group consisting of styrene, α-methyl styrene, vinyl toluene, 3-methyl styrene, 4-methyl styrene, 4-cyclohexylstyrene, 4-para tolylstyrene, para-chlorostyrene, 4-tert-butyl styrene, 1-vinylnaphthalene, and 2-vinylnapthalene; wherein the acrylate is selected from the group consisting of butyl acrylate, ethyl acrylate, 2-ethylhexyl acrylate, vinyl acrylate, and any combination thereof; wherein methacrylate is selected from the group consisting of hydroxyethylmethacrylate, butyl methacrylates, and any combination thereof;

wherein the propoxylate is hydroxyl butyl vinyl ether propoxylate; and/or wherein the sulphonate is selected from the group consisting of styrene sulphonate, 2-acrylamido 2-methylpropane sulphonate, sodium allyl sulphonate, sodium methallyl sulphonate, and any combination thereof.

3. The composition of claim 2, wherein the at least one conjugated diene monomer is 1,3-Butadiene; wherein the at least one vinyl substituted aromatic monomer is styrene; wherein the at least one polar co-monomer is butyl acrylate.

4. The composition of claim 1, wherein the composition further comprises at least one conventional ingredient; wherein the conventional ingredient is selected from the group consisting of plasticizer, accelerator, activator, antioxidant, antiozonant, aromatic oil, and curing agent; and/or wherein said conventional ingredient is at an amount ranging from about 0.1 PHR to about 50 PHR based on parts per hundred of rubber.

5. A tyre tread comprising the composition of claim 1.

6. A process for preparing a composition comprising a polymer latex or rubber and a filler consisting of graphene, the process comprising:
   i. polymerizing at least one conjugated diene monomer, at least one vinyl substituted aromatic monomer, and at least one polar co-monomer to obtain the polymer latex or rubber, wherein the at least one polar co-monomer is selected from the group consisting of acrylate, methacrylate, propoxylate and sulphonate, and wherein the conjugated diene monomer is employed at an amount ranging from about 45 parts per hundred of rubber (PHR) to about 70 PHR, the vinyl substituted aromatic monomer is employed at an amount ranging from about 10 PHR to about 30 PHR, the polar co-monomer is employed at an amount ranging from about 1 PHR to about 30 PHR,
   ii. optionally coagulating the polymer latex to obtain the polymer rubber, and
   iii. adding about 0.5 PHR to about 5.0 PHR of graphene and mixing to obtain the said composition, wherein the graphene is added either prior to, during or post preparation of the polymer latex or rubber.

7. The process as claimed in claim 6, wherein the process comprises:
   i) polymerizing at least one conjugated diene monomer, at least one vinyl substituted aromatic monomer, and at least one polar co-monomer in presence of graphene to obtain the composition comprising the polymer latex and graphene, and
   ii) optionally coagulating the composition comprising the polymer latex and graphene to obtain the composition comprising the polymer rubber and graphene.

8. The process as claimed in claim 6, wherein the process comprises:
   i) polymerizing at least one conjugated diene monomer, at least one vinyl substituted aromatic monomer, and at least one polar co-monomer to obtain the polymer latex,
   ii) adding graphene to the polymer latex and mixing to obtain the composition comprising the polymer latex and graphene; and
   iii) optionally coagulating the composition comprising the polymer latex and graphene to obtain the composition comprising polymer rubber and graphene.

9. The process as claimed in claim 6, wherein the process comprises:
   i) polymerizing at least one conjugated diene monomer, at least one vinyl substituted aromatic monomer, and at least one polar co-monomer to obtain the polymer latex;
   ii) coagulating the polymer latex to obtain polymer rubber, and
   iii) adding graphene to the polymer rubber and mixing to obtain the composition comprising the polymer rubber and graphene.

10. The process of claim 6, wherein the at least one conjugated diene monomer is selected from the group consisting of 1,3-Butadiene, isoprene, 1,3-ethylbutadiene, 1,3-pentadiene, 1,3-hexadiene, 1,3-pentadiene, 1,3-cyclooctadiene and 1,3 octadiene; wherein the at least one vinyl substituted aromatic monomer is selected from the group consisting of styrene, α-methyl styrene, vinyl toluene, 3-methyl styrene, 4-methyl styrene, 4-cyclohexylstyrene, 4-para tolylstyrene, para-chlorostyrene, 4-tert-butyl styrene, 1-vinylnaphthalene and 2-vinylnapthalene; wherein the acrylate is selected from the group consisting of butyl acrylate, ethyl acrylate, 2-ethylhexyl acrylate, vinyl acrylate and any combination thereof; wherein the methacrylate is selected from hydroxyethylmethacrylate, butyl methacrylates, and any combination thereof; wherein the propoxylate is hydroxyl butyl vinyl ether propoxylate; wherein the sulphonate is selected from the group consisting of styrene sulphonate, 2-acrylamido 2-methylpropane sulphonate, sodium allyl sulphonate, sodium methallyl sulphonate and any combination thereof; and/or wherein the polymer is a terpolymer or a tetrapolymer.

11. The process of claim 6, wherein the polymerizing is carried out in presence of one or more components selected from the group consisting of emulsifier, modifier, water, catalyst and activator; wherein the polymerizing is carried out under nitrogen atmosphere; and/or wherein the polymerizing is carried out at temperature ranging from about 5° C. to about 13° C.; wherein the polymerization is continued till the conversion of the reaction is reached to at least about 25% total solid content; and/or wherein the polymer rubber obtained is washed with a solvent and dried, wherein the modifier is selected from the group consisting of Tert-dodecyl mercaptan (TDM), aldehydes, acids, dibenzyltrithiocarbonate and any combination thereof.

12. The process of claim 11, wherein the polymerizing comprises the steps of:
   a. contacting (i) the emulsifier optionally mixed along with modifier and/or water (ii) with conjugated diene monomer, vinyl substituted aromatic monomer, and one or more polar co-monomer, and mixing at a temperature ranging from about 5° C. to about 13° C.; and
   b. optionally contacting reaction mixture obtained from step a) with at least one catalyst, an activator or a combination thereof.

13. The process of claim 11, wherein the emulsifier is employed at an amount ranging from about 4 PHR to about 7 PHR, the modifier is employed at an amount ranging from about 0.15 PHR to about 0.40 PHR, the catalyst is employed at an amount ranging from about 0.01 PHR to about 1.0 PHR, and/or the activator is employed at an amount ranging from about 0.01 PHR to about 1.0 PHR.

14. The process of claim 11, wherein the emulsifier comprises emulsifying agents selected from the group consisting of Rosin acid, fatty acid, sodium dodecyl naphthyl methyl sulphonate (DNMS), sodium lauryl sulfate, sodium dioctyl sulfosuccinate, sodium oleate, triethanolamine stearate, ethylenediaminetetraacetic acid (EDTA), potassium chloride, benzalkonium chloride and any combination thereof; the catalyst is selected from the group consisting of Sodium Formaldehyde Sulfoxylate (SFS), FeSO$_4$, EDTA, CuSO$_4$, K$_2$SO$_4$, NH$_4$SO$_3$, NaHSO$_3$ and any combination thereof; and the activator is a peroxide.

15. The process of claim 11, wherein the process further comprises adding antioxidant to the polymer latex; wherein the antioxidant is selected from the group consisting of poly(1,2-dihydro-2,2,4-trimethyl-quinoline) (TMQ), Tris (nonylphenyl)phosphite (TNPP), styrenated phenol, phenyl-ß-napthyl amine (PBN), octylated diphenyl amine (ODPA), p-oriented styrenated diphenyl amine (SDPA), butylated hydroxytoluene (BHT), 4-methyl-6 terlbutyl phenol (BPH), cyclic acetals, N, N'-1,6-hexanediylbis[3,5-bis-4-hydroxy-phenylpropanamide], paraphenylene diamine, and any combination thereof; and/or wherein the antioxidant is employed at an amount ranging from about 0.5 PHR to 2 PHR.

16. The process of claim 6, wherein the optional coagulation is carried out by:
   diluting the polymer latex with water and mixing,
   optionally heating the latex to a temperature ranging from about 50° C. to about 80° C.,
   optionally adding an antioxidant and mixing, and
   adding coagulating agent to the polymer latex and mixing to obtain the polymer rubber.

17. The process of claim 16, wherein the coagulating agent is selected from the group consisting of strong acid, sodium chloride, calcium chloride, copolymer of Epichlorohydrin and dimethylamine and any combination thereof; and/or wherein the coagulating agent is employed at an amount ranging from about 0.2 PHR to about 1 PHR.

18. The process of claim 6, wherein the mixing is carried out by techniques selected from the group consisting of stirring, agitation and any combination thereof; wherein the mixing is carried out at a speed ranging from about 100 rpm to about 1000 rpm; and/or wherein after the completion of polymerization the reaction is quenched using short stop solution.

19. The process of claim 6, wherein graphene is added in the form of a graphene emulsion comprising about 0.5 PHR to about 5 PHR of graphene and about 0.5 PHR to about 10 PHR of fatty soap; and/or wherein the graphene or graphene emulsion is added to the polymer latex at temperature ranging from about 40° C. to about 55° C.

20. The process of claim 6, wherein the process comprises adding at least one conventional ingredient to the polymer latex or rubber and mixing; wherein about 0.1 PHR to about 50 PHR of conventional ingredient(s) is added to 100 PHR of polymer latex or rubber; and/or wherein the one or more conventional ingredient(s) is selected from the group consisting of accelerator(s), plasticizer(s), activator(s), antioxidant(s), antiozonant(s), aromatic oil and curing agent(s).

* * * * *